United States Patent
Ichino et al.

(10) Patent No.: US 6,522,836 B2
(45) Date of Patent: *Feb. 18, 2003

(54) LENS-FITTED PHOTO FILM UNIT HAVING A RECESS AND RIDGES IN A HOUSING THEREOF

(75) Inventors: Shuichi Ichino, Kanagawa (JP); Kazuo Kamata, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/933,770

(22) Filed: Aug. 22, 2001

(65) Prior Publication Data

US 2002/0006277 A1 Jan. 17, 2002

Related U.S. Application Data

(62) Division of application No. 09/323,948, filed on Jun. 2, 1999, now Pat. No. 6,301,437, which is a division of application No. 08/683,758, filed on Jul. 17, 1996, now Pat. No. 5,933,658.

(30) Foreign Application Priority Data

| Jul. 19, 1995 | (JP) | ............................................. 7-182759 |
| Aug. 14, 1995 | (JP) | ............................................. 7-206927 |
| Aug. 25, 1995 | (JP) | ............................................. 7-217723 |
| Sep. 8, 1995 | (JP) | ............................................. 7-231700 |

(51) Int. Cl.$^7$ ............................................. G03B 17/02
(52) U.S. Cl. ............................. 396/6; 396/429; 83/425; 83/435.2
(58) Field of Search ........................... 396/6, 429, 535; 83/27, 102, 425, 435.2

(56) References Cited

U.S. PATENT DOCUMENTS

| 5,210,561 | A | | 5/1993 | Nakai et al. |
| 5,285,228 | A | | 2/1994 | VanDeMoere |
| 5,436,685 | A | | 7/1995 | Yamashina |
| 5,537,176 | A | | 7/1996 | Hara et al. |
| 5,634,164 | A | | 5/1997 | Isozaki |
| 5,875,369 | A | | 2/1999 | Yamashina et al. |
| 5,933,658 | A | * | 8/1999 | Ichino et al. ................ 396/535 |
| 6,153,042 | A | * | 11/2000 | Tominaga .................... 156/344 |
| 6,301,437 | B1 | * | 10/2001 | Ichino et al. ................ 396/429 |

FOREIGN PATENT DOCUMENTS

| EP | 0598393 A2 | 5/1994 |
| JP | 416448 | 2/1992 |
| JP | 58559 | 2/1993 |

* cited by examiner

Primary Examiner—David M. Gray
(74) Attorney, Agent, or Firm—Young & Thompson

(57) ABSTRACT

A lens-fitted photo film unit includes a housing and a wrapping wound about the housing in belt-like fashion. The housing is pre-loaded with unexposed photo film, and incorporates a taking lens and a shutter mechanism. The housing has a rear cover, which has recesses. Outer edges of the recesses are convex. Ridges are formed in the recesses for supporting the wrapping about the housing. Outer edges of the recesses are convex.

7 Claims, 21 Drawing Sheets

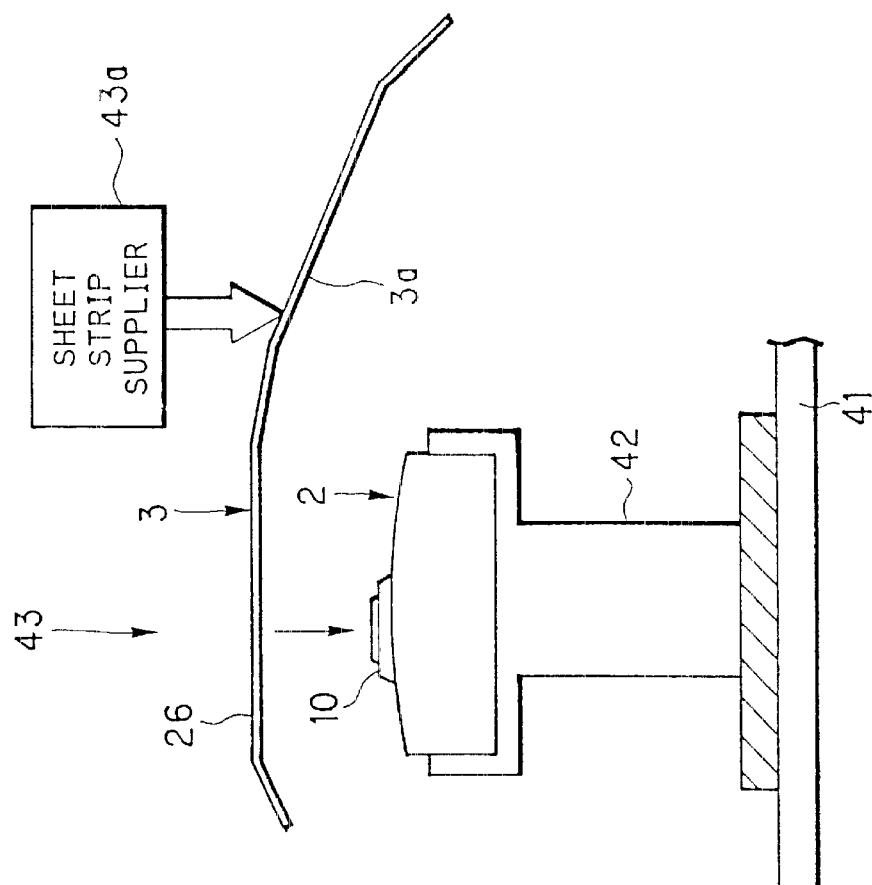
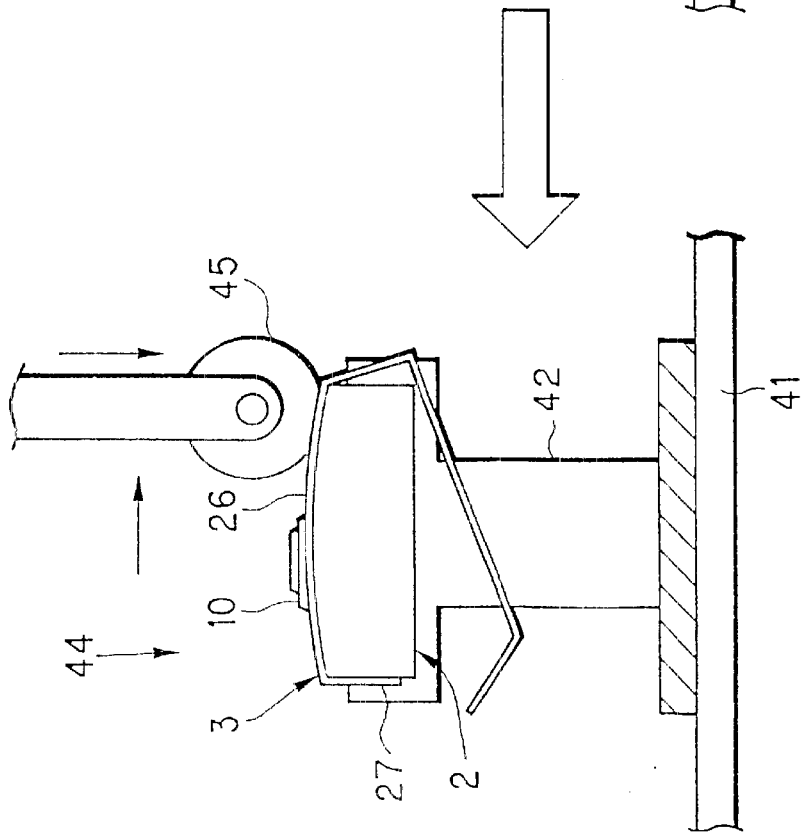

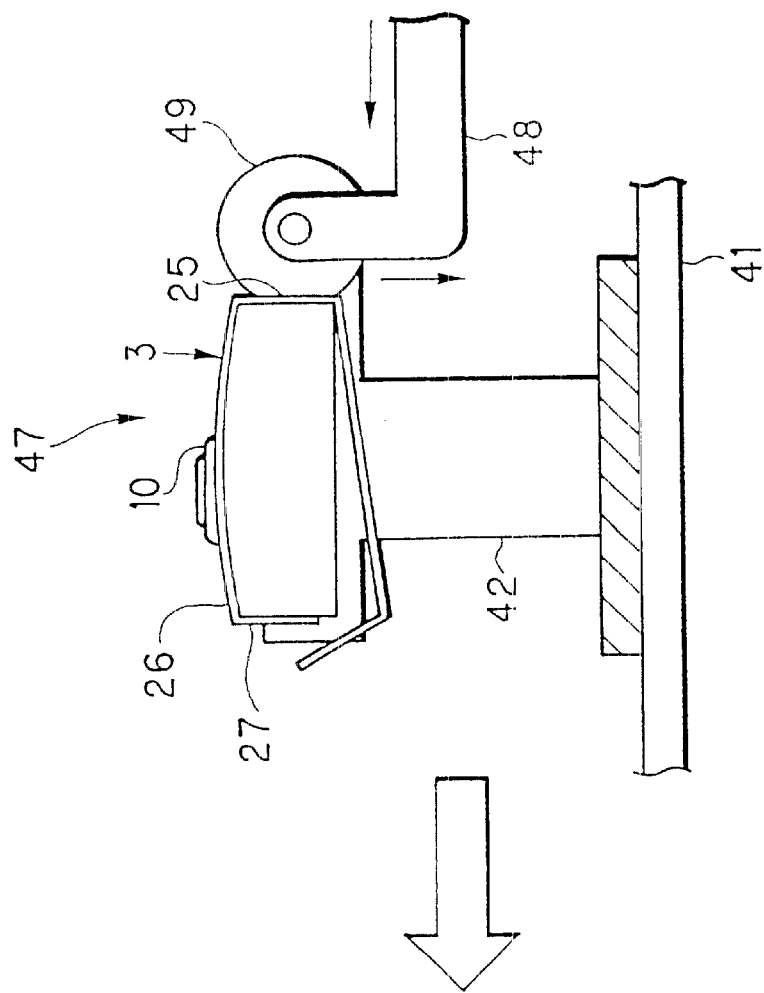
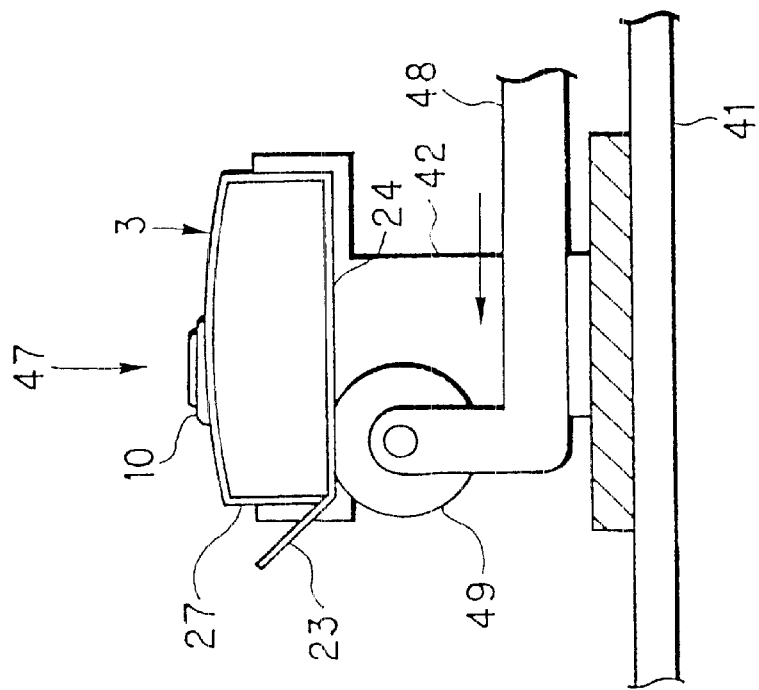

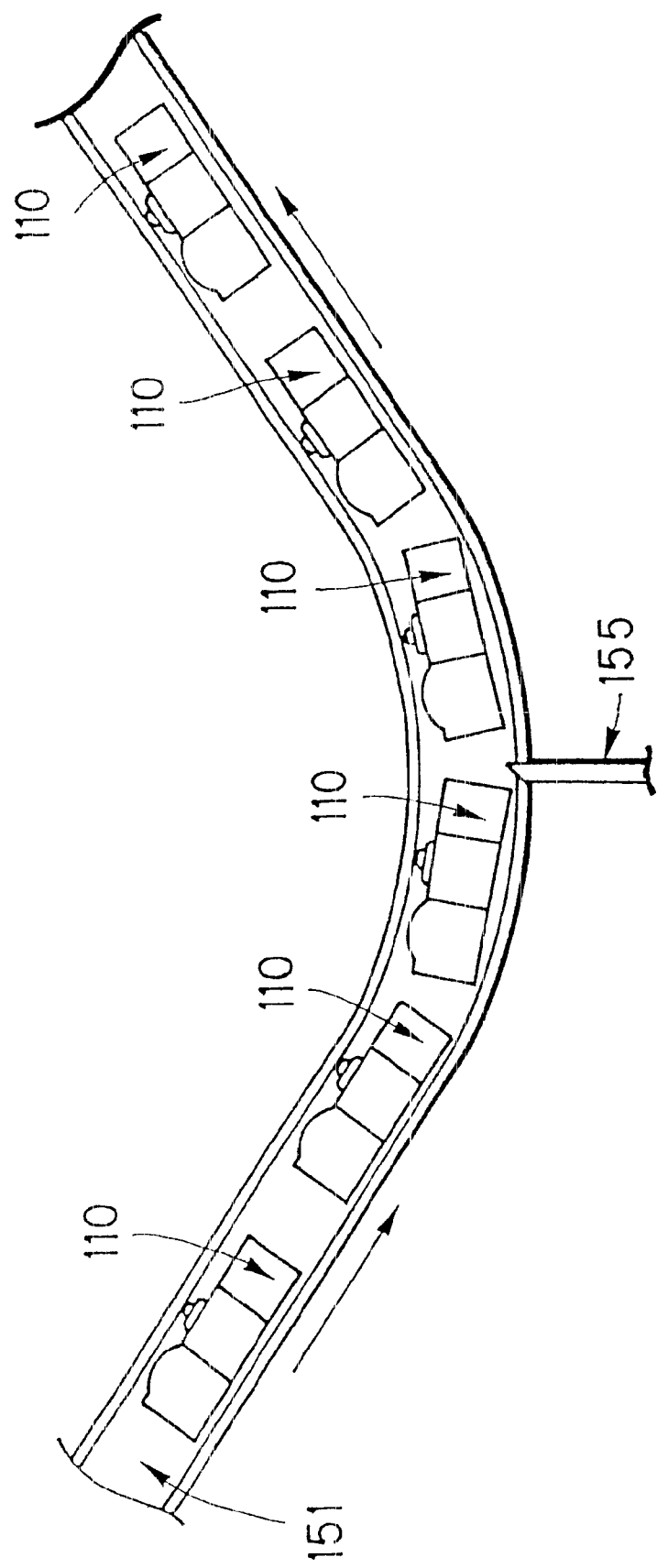

F I G. 15
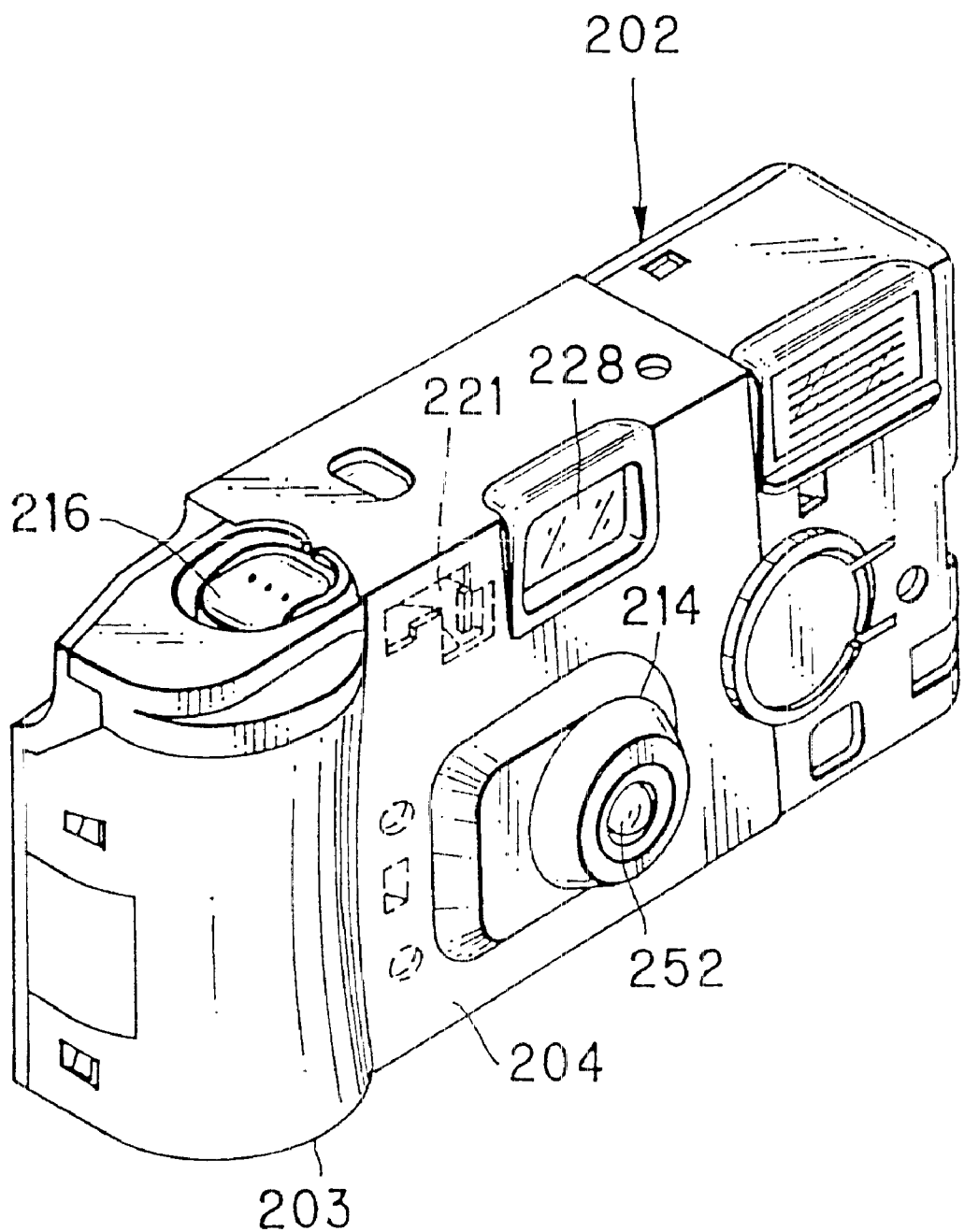

1

LENS-FITTED PHOTO FILM UNIT HAVING A RECESS AND RIDGES IN A HOUSING THEREOF

This application is a division of application Ser. No. 09/323,948 filed on Jun. 2, 1999, now U.S. Pat. No. 6,301,427 which is a division of application Ser. No. 08/683,758 filed on Jul. 17, 1996, now U.S. Pat. No. 5,933,658 the entire contents of which are hereby incorporated by reference.

BACKGROUND OF THE INVENTION

1. Field of the Invention

The present invention relates to a lens-fitted photo film unit, a method of mounting a wrapping on the same, and a method of removing the wrapping from the same. More particularly, the present invention relates to a lens-fitted photo film unit of which a housing has a wrapping disposed thereabout, a method of mounting the wrapping on the same, and a method of removing the wrapping from the same, both in efficient fashion.

2. Description Related to the Prior Art

A lens-fitted photo film unit is known, and disclosed for example in U.S. Pat. No. 5,436,685 (corresponding to JP-A 5-19419). The lens-fitted photo film unit includes a housing, which incorporates a simple shutter mechanism, and is pre-loaded with unexposed photo film. The housing has a packaging or wrapping disposed thereabout. When a user purchases the lens-fitted photo film unit, he or she can take an exposure readily with it. After taking all exposures on the photo film, the lens-fitted photo film unit can be forwarded to a photofinishing agent without a difficult operation. The lens-fitted photo film unit is commercially marketed in a large scale.

The lens-fitted photo film unit is loaded with the photo film in the course of the manufacture. It is necessary to protect the photo film from moisture before a user actually uses the lens-fitted photo film unit after the manufacture. The lens-fitted photo film unit is firmly wrapped in a water-tight outer packaging bag by a manufacturer, and shipped out. The user tears open the outer packaging bag before he or she uses the lens-fitted photo film unit.

The lens-fitted photo film unit has an advantage of a low cost. To reduce the manufacturing cost, the wrapping to cover the housing consists of a paper box having a decoratively printed surface. The paper box includes six cover regions as rectangular faces and an overlapped region, which in combination constitute one piece of paper. The paper piece is bent straight along each of edges. Also Japanese Utility Model Application No. 3-56924 suggests the lens-fitted photo film unit of which a sheet strip like a belt is used as a wrapping to cover the housing. The sheet strip is wound about the center of the housing. Ends of the sheet strip are attached to one another by virtue of an adhesive agent. Two lateral portions of the housing remain uncovered. This has an advantage in facilitation of assembling operation. Appearance of the lens-fitted photo film unit is also enhanced, as the sheet strip can give a minimized impression to purchasers.

Whichever type of the wrapping is used, the cover regions and the overlapped region are adhered to one another to set the wrapping completely. There is a shortcoming in the wrapping, which is likely to project outwards away from the housing, to render the appearance of the lens-fitted photo film unit remarkably worse. To overcome this shortcoming, Japanese Utility Model Application No. 2-57427 suggests the lens-fitted photo film unit in which the wrapping is directly adhered to the housing for the purpose of tight contact between them.

To attach the wrapping, synthetic adhesive agent, for example, polyvinyl alcohol adhesive agent, is typically used. The adhesive agent essentially-consists of synthetic resin as main component, which is resolved with organic solvent. The organic solvent is volatilized to solidify the main synthetic resin. As the outer packaging bag above is used for enclosing the lens-fitted photo film unit, there is a problem due to the organic solvent. When the lens-fitted photo film unit is wrapped without complete volatilization of the organic solvent, organic gas is created, and remains inside the outer packaging bag without dispersion. It is likely that the photo film pre-loaded in the lens-fitted photo film unit is degraded by the organic gas.

To economize natural resources and lessen industrial wastes, there are suggestions of recycling the lens-fitted photo film unit. When a user forwards the lens-fitted photo film unit to a photofinishing agent after exposing the photo film, the lens-fitted photo film unit is collected from the agent to a photo laboratory, where the photo film is removed from the lens-fitted photo film unit and subjected to development and operation of producing photo prints. The lens-fitted photo film unit after the removal of the photo film is withdrawn by the manufacturer. The manufacturer peels the wrapping from the housing, and disassembles the housing into parts. Reusable ones of them are transferred to a manufacturing process, and remounted on a new product. Meltable ones of them are pelleted, and recycled as regenerated material. The wrapping is also recycled in a form of regenerated paper.

For the lens-fitted photo-film unit in which the wrapping is directly attached to the housing, the wrapping must be peeled partially by a cutter blade of a specialized shape, and then pulled away manually from the housing, before the wrapping can be removed from the housing according to a known technique. However the wrapping of every product must be individually peeled by manual operation, which is inefficient and inconsistent with a low cost of manufacture.

SUMMARY OF THE INVENTION

In view of the foregoing problems, an object of the present invention is to provide a method of removing the wrapping from a lens-fitted photo film unit in an efficient fashion, and the same lens-fitted photo film unit, and a method of mounting the wrapping on the same.

In order to achieve the above and other objects and advantages of this invention, a lens-fitted photo film unit has a wrapping member which is wound about at least one portion of the housing in belt-like fashion, and attached to the housing with water soluble adhesive agent. A substantially straight groove is formed in an outside of the housing, and extended transverse to a direction of winding the wrapping member, the groove having two distal ends, and being covered between the distal ends by the wrapping member.

To remove the wrapping member, relative movement is effected, for the lens-fitted photo film unit to move relative to a cutter blade while the lens-fitted photo film unit is contacted on the cutter blade, the cutter blade being disposed as high as the groove in the housing, and cutting the wrapping member along the groove. A cut end of the wrapping member, cut by the cutter blade, is pulled away from the groove, so as to peel the wrapping member from the housing.

Furthermore, the housing is rotated while the cut end is pulled, about an axis substantially parallel with the groove.

In a preferred embodiment, the wrapping member includes a sheet strip which is arranged transverse to a borderline defined between a front cover and a rear cover of the housing, and wound about at least the one portion of the housing in belt-like fashion.

A variant wrapping member includes a sheet, which comprises a strip portion wound about at least the one portion of the housing in belt-like fashion, and first and second flaps disposed to project respectively from longer sides of the strip portion and directed opposite to each other. The wrapping member is arranged transverse to a borderline defined between the front cover and the rear cover.

To mount the wrapping member on the housing, a sheet strip is supplied as the wrapping member, there being a front opening formed in the wrapping member, there being a projecting portion disposed to project from the front cover for protecting at least the taking lens, and insertable in the front opening. The wrapping member is mounted on a front of the housing while the projecting portion is inserted in the front opening. The wrapping member is transverse to a borderline defined between the front cover and the rear cover. After mounting the wrapping member on the front of the housing, the wrapping member is mounted serially on plural mounting faces of the housing, to wind the wrapping member about the housing in belt-like fashion.

Furthermore, at least one face of the housing is held while a front of the housing is directed upwards, the at least one face is different from the front and from the plural mounting faces. The wrapping member is placed on the housing being held, the projecting portion being inserted in the front opening in the wrapping member.

In another preferred embodiment, a recess is formed in an outside of the housing, for reducing thickness of a wall of the housing, the recess being covered by the wrapping member at least partially, and an outer edge of the recess being obtuse with curvature.

Furthermore, at least one ridge is formed in the recess of the housing, arranged in striped fashion or grating fashion, for reinforcing the wall of the housing, the ridge being covered by the wrapping member at least partially, and an edge of the ridge being obtuse with curvature.

In still another preferred embodiment, the housing also incorporates a release lever for actuating the shutter mechanism. An opening is formed in the housing, wherein the release lever or a movable portion of the shutter mechanism emerges through the opening at least partially. A wrapping member is mounted on at least one portion of the housing, attached to the housing with adhesive agent, for covering and closing the opening. A minutely uneven pattern is formed at least on a surface of the release lever or the movable portion emerging through the opening, for preventing the release lever or the movable portion from fixation on the wrapping member with the adhesive agent.

Furthermore, the adhesive agent comprises pressure sensitive adhesive agent. The wrapping member includes a sheet strip wound about at least the one portion of the housing in belt-like fashion.

In the present invention, the wrapping member can be removed from a lens-fitted photo film unit in efficient fashion.

BRIEF DESCRIPTION OF THE DRAWINGS

The above objects and advantages of the present invention will become more apparent from the following detailed description when read in connection with the accompanying drawings, in which:

FIG. 3A is an explanatory view illustrating a sheet supply station where the wrapping is initially supplied;

FIG. 3B is an explanatory view illustrating a first pressing station where the wrapping is initially pressed against the housing;

FIGS. 4A and 4B are explanatory views illustrating a second pressing station where the wrapping is finally pressed against the housing;

FIG. 11 is an explanatory view in plan, illustrating an arrangement of a cutter blade and a conveyor;

FIG. 15 is a perspective illustrating still another preferred lens-fitted photo film unit;

DETAILED DESCRIPTION OF THE PREFERRED EMBODIMENTS

Figure 1:
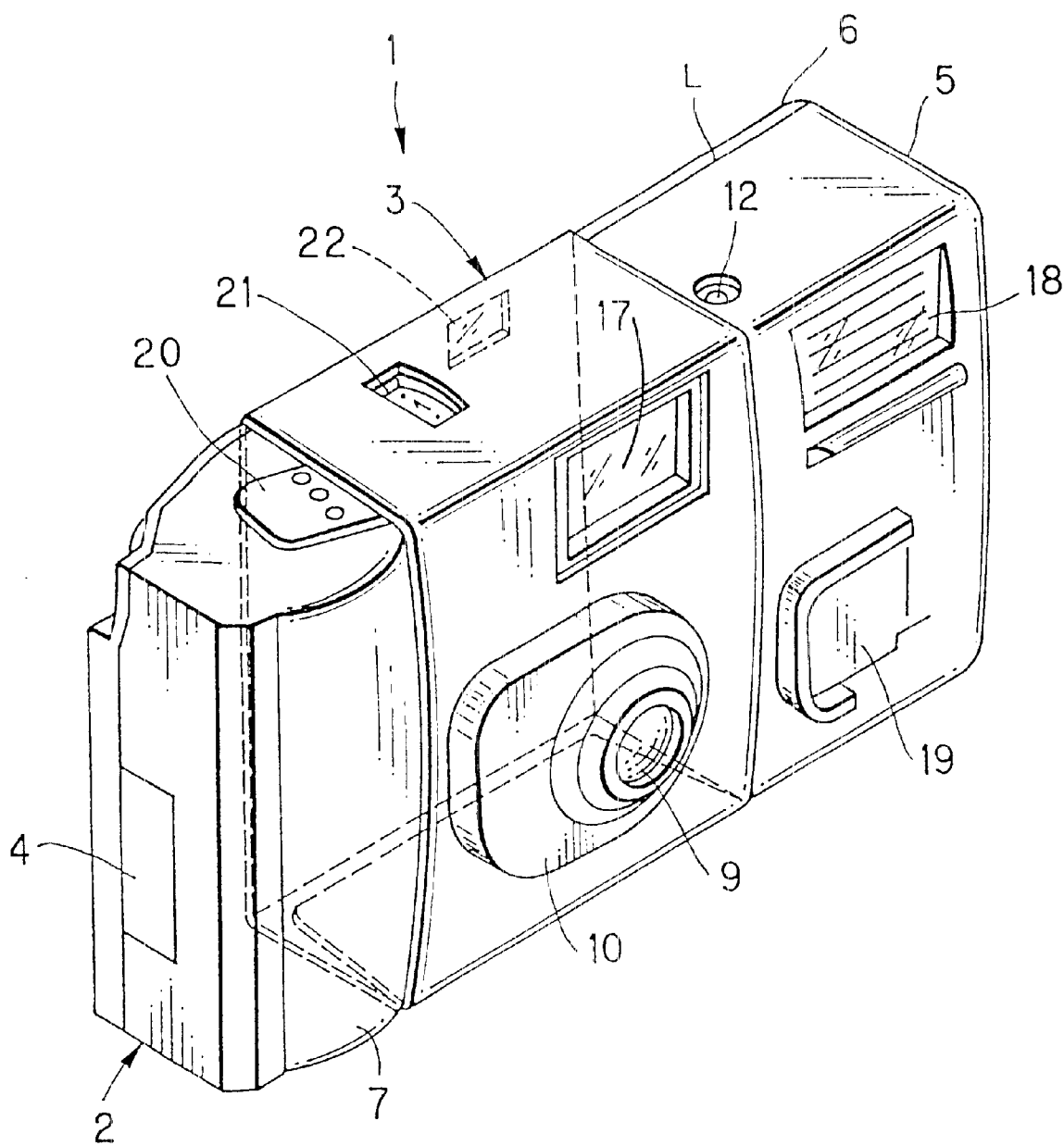
FIG. 1 is a perspective illustrating a lens-fitted photo film unit.

In FIG. 1, a lens-fitted photo film unit 1 includes a housing 2 and a wrapping 3 mounted about the center of the housing 2 vertically. The housing 2 consists of a main body 4, a front cover 5 and a rear cover 6. The main body 4 incorporates a roll of-photo film and a cassette, and includes a shutter mechanism and a wind stop mechanism for one-frame feeding. The front cover 5 and the rear cover 6 are retained on the main body 4 by engagement of hooks. The structure of the lens-fitted photo film unit is basically suggested in U.S. Pat. No. 5,436,685 (corresponding to JP-A 5-19419).

The housing 2 generally has a shape of a rectangular parallelepipeds, and has a back-to-front thickness smaller than a diameter of a photo film cassette. There is a cassette containing chamber formed in the main body 4. An outer wall of the cassette containing chamber is disposed to project to the front in a shape of part of a cylinder. The front cover 5 has a projecting portion 7 to cover the front of the cassette containing chamber. The projecting portion 7 is used as a grip at the time of taking exposures. The front of the front cover 5 has a projecting portion 10 for covering a shutter mechanism and a taking lens 9. The projecting portion 10 is slowly curved thereabout toward the upper and lower edges of the front cover 5.

The front of the front cover 5 has a finder objective window and an electronic flash window. An objective lens 17 of a viewfinder appears through the finder objective window. A flash emanator 18 appears through the electronic flash window. The objective lens 17 and the flash emanator 18 are incorporated in the main body 4. A flash switch 19 is disposed in front of the front cover 5. A shutter release button 20 is formed with the top of the front cover 5. There is a frame counter window 21 formed in the top of the front cover 5. Also the rear cover 6 has a finder eyepiece window, through which a finder eyepiece lens 22 appears behind the main body 4.

Figure 2:
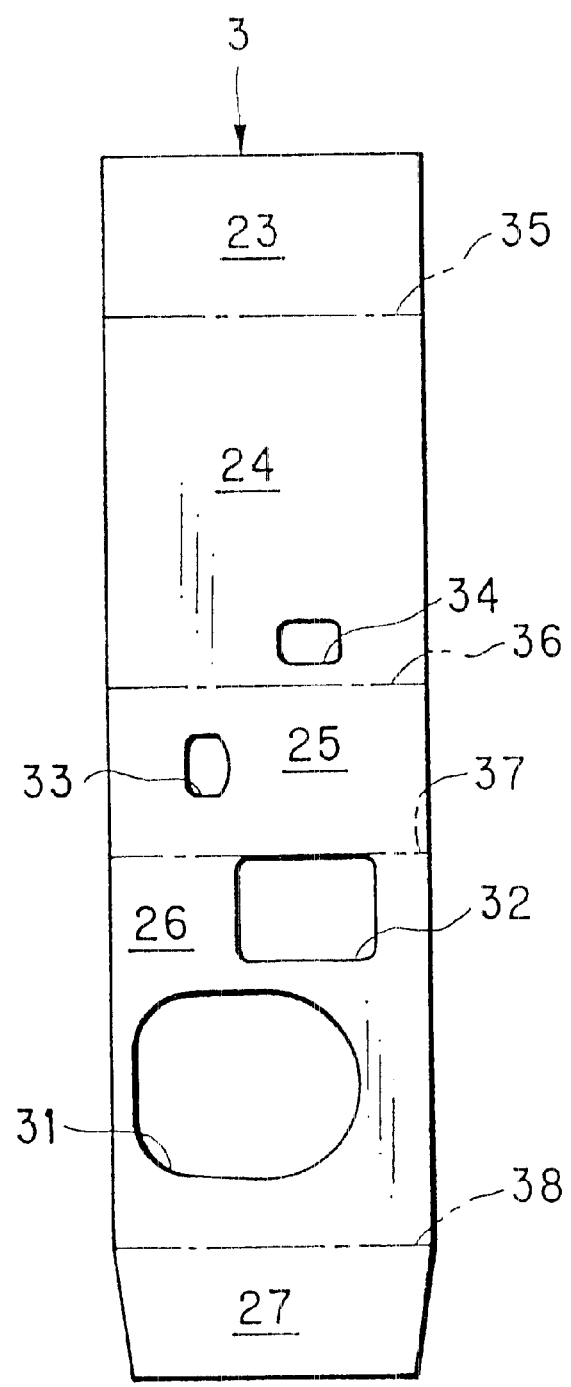
FIG. 2 is a development illustrating an obverse of a wrapping.

In FIG. 2 where the wrapping 3 is developed, the wrapping 3 consists of a sheet strip formed from polyethylene terephthalate (PET) or synthetic paper. The wrapping 3 includes a bottom region or a first end 23, a rear region 24, a top region 25, a front region 26, and an overlapped region or a second end 27. The second end 27 is used for adhesion by the first end 23. Note that an outer surface of the wrapping 3 is provided with a decorative printed pattern and a printed notice required for a user to handle the lens-fitted photo film unit.

The front region 26 has openings 31 and 32. The projecting portion 10 is inserted through the opening 31. The objective lens 17 appears through the opening 32. The top region 25 has an opening 33, through which the frame counter window 21 appears. The rear region 24 has an opening 34, through which the finder eyepiece lens 22 appears.

The wrapping 3 has outward bend lines 35–38 defined between the first end 23, the rear region 24, the top region 25, the front region 26 and the second end 27, as indicated by the phantom lines. The whole area of the back of the wrapping 3 is coated with pressure sensitive adhesive agent. The wrapping 3 is attached to the faces of the housing 2, one face after another, while the wrapping 3 is bent along the bend lines 35–38. Note that the wrapping 3 is pre-bent lightly along the bend lines 35–38. Or the wrapping 3 is formed with a smaller thickness along the bend lines 35–38. If the material of the wrapping 3 is soft enough, the wrapping 3 does not require the pre-bending or smaller thickness.

A process of adhering the wrapping 3 on the housing 2 is described now with reference to FIGS. 3A, 3B, 4A and 4B. In FIG. 3A, there is a conveyor belt 41 where a pair of jigs or supports 42 are erected for squeezing and holding the housing 2. When the conveyor belt 41 is driven, the supports 42 are moved horizontally with the conveyor belt 41. The housing 2 transferred from stations of assembly of the parts has been conveyed to an upstream end of the conveyor belt 41. A robot arm disposed close to the conveyor belt 41 moves the housing 2 to the supports 42, which are caused to hold the housing 2.

The conveyor belt 41 is driven. The supports 42 come to a sheet supply station 43. The one sheet strip as the wrapping 3 is lowered by a wrapping member supplier or sheet strip supplier 43a to the housing 2 of which the front is directed upwards. An adhesive coated face 3a of the wrapping 3 is directed downwards, while the opening 31 in the front region 26 is set in a position of the projecting portion 10. Initially the front region 26 of the wrapping 3 is attached to the front of the housing 2, by inserting the projecting portion 10 through the opening 31.

The conveyor belt 41 is driven next, to convey the supports 42 to a first pressing station 44. As is illustrated in FIG. 3B, when the housing 2 comes to the first pressing station 44 with the front region 26 of the wrapping 3 adhered provisionally thereto, a pressing roller 45, as a wrapping member winder device, is lowered to press the front region 26 on the front of the housing 2, and press the second end 27 on its bottom. The pressing roller 45 is moved reciprocally for a plurality of times in contact of the wrapping 3 on the front and the bottom of the housing 2. Then the conveyor belt 41 is driven to convey the supports 42 to a second pressing station 47 of FIGS. 4A and 4B.

In the second pressing station 47, a pressing roller 49 is supported on an L-arm 48. The pressing roller 49, as a wrapping member winder device, presses the top region 25 on the top of the housing 2 in FIG. 4A, and presses the rear region 24 on the rear of the housing 2 in FIG. 4B. Finally the pressing roller 49 presses the first end 23 on the outer face of the second end 27. Each time the pressing roller 49 presses a region of the wrapping 3, the pressing roller 49 is being moved reciprocally for a plurality of times, in similar fashion to the pressing roller 45.

The wrapping 3 adhered about the housing 2 perpendicularly crosses the borderline L (See FIG. 1) defined between the front cover 5 and the rear cover 6 retained together, so that the front cover 5 and the rear cover 6 are kept in undetachably tight contact on one another. The wrapping 3 is formed from polyethylene terephthalate (PET) which has much higher strength than paper. Accordingly the lens-fitted photo film unit 1 can have high resistance to shock due to drop, vibration or other external impulse.

To disassemble the lens-fitted photo film unit 1 after being used, a cutter blade is operated to cut the wrapping 3 in insertion through the borderline L. The front cover 5 and the rear cover 6 are pulled away from one another, until the hooks of the front cover 5 and the rear cover 6 are broken, to separate the front cover 5 and the rear cover 6. Note that it is preferable to use the material of the same kind for the wrapping 3 and the adhesive agent as for the front cover 5 and the rear cover 6. The front cover 5 and the rear cover 6 can be pelleted with the wrapping 3 without removing the wrapping 3. Melting of the wrapping 3 together with the front cover 5 and the rear cover 6 is advantageous, because of efficiency in operation of the recycling.

Figure 5:
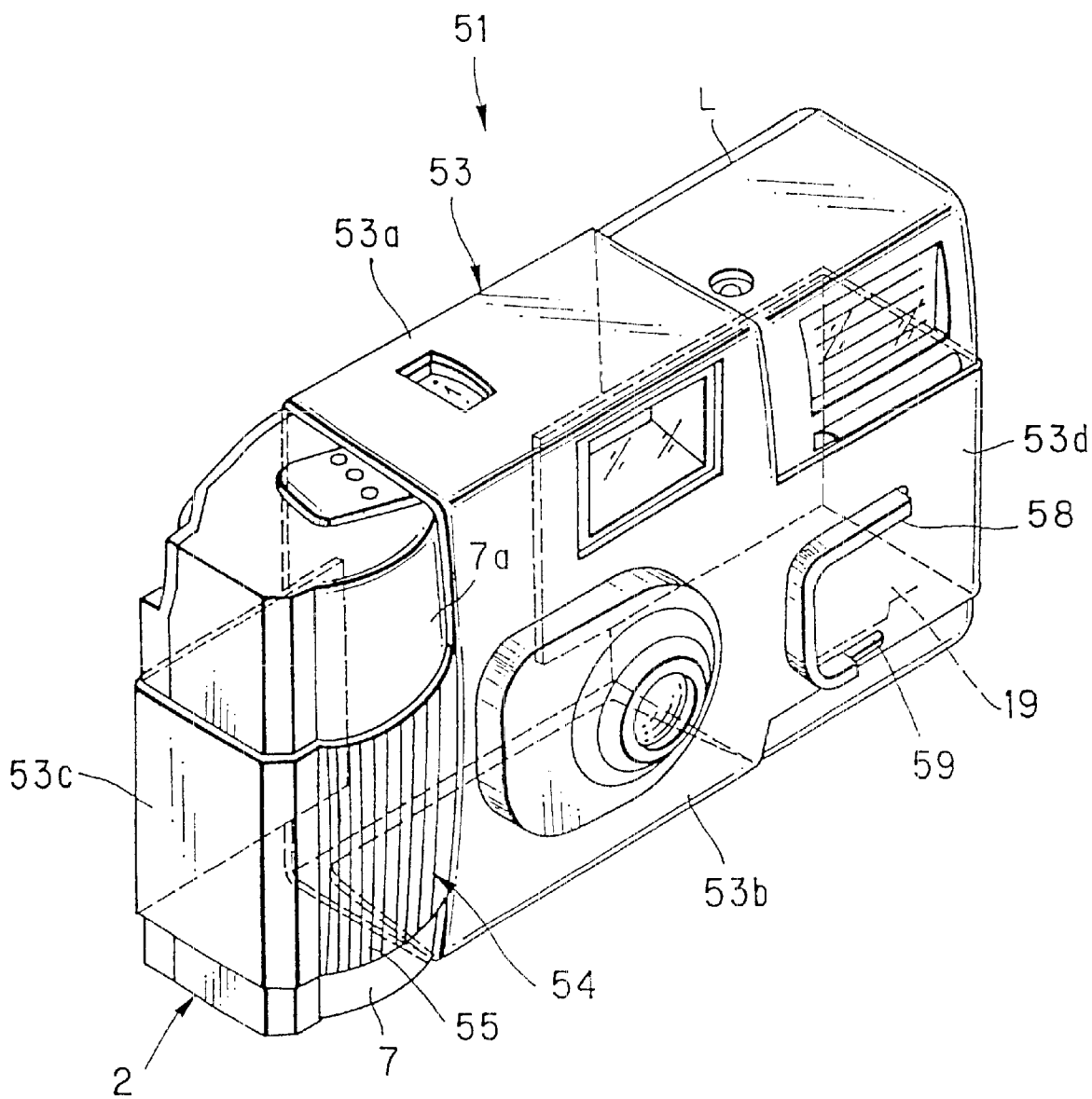
FIG. 5 is a perspective illustrating a variant lensfitted photo film unit in which a wrapping is extended both horizontally and vertically.

FIG. 5 illustrates another preferred lens-fitted photo film unit 51, in which a wrapping 53 of with two side flaps 53c and 53d is mounted about the housing 2. The wrapping 53, as viewed in development, includes one strip portion and the side flaps 53c and 53d. The one strip portion is constituted by upper and lower flaps 53a and 53b aligned vertically. The side flaps 53c and 53d are aligned horizontally.

The flap 53c has a curved region 54 which corresponds to a curved face 7a of the projecting portion 7. There are a plurality of straight grooves 55 for rendering the contact between the curved region 54 and the curved face 7a tight in covering the curved face 7a, as indicated by the solid lines. The curved region 54 has a lower strength in flexure due to the grooves 55 than the remaining regions, and is provided with easiness in flexure.

The flap 53d has a three-sided slot 59 having a channel shape. A three-sided ridge 58 is disposed to project from a button portion formed with the front cover 5. The three-sided slot 59 receives insertion of the three-sided ridge 58, for external operation of the flash switch 19 of the front cover 5.

The whole of the back of the wrapping 53 is coated with the pressure sensitive adhesive agent. At first, the center of the wrapping 53 between the upper and lower flaps 53a and 53b and the side flaps 53c and 53d is attached to the housing 2. Then the side flaps 53c and 53d are attached to the right and left faces and to the rear face. Afterwards the upper and lower flaps 53a and 53b are attached to the bottom, the top and the rear of the housing 2. Finally distal ends of the upper and lower flaps 53a and 53b are attached to each other on the bottom of the housing 2. For this attaching process, the pressing rollers of the above embodiment are used similarly. To hold the housing 2 during the attachment, it is desirable to use supports for holding four (4) corners of the housing 2 not for adhesion. To attach the side flaps 53c and 53d, additional pressing rollers can be used.

In the above embodiment, the whole of the back surface of the wrapping or sheet strip is coated with pressure-sensitive adhesive agent. However the overlapped portions, namely the first and second ends of the sheet strip, may be coated with the adhesive agent without coating of the remaining portions. It is possible to coat only the front portion of the sheet strip with the adhesive agent, without coating of the remaining portions. The wrapping has a belt-like shape. However the present invention is applicable to a wrapping having a small length only to cover three faces of the lens-fitted photo film unit. For example, the front, top and rear of the housing may be covered without covering its bottom. The wrapping is formed of polyethylene terephthalate, but may be other materials such as polystyrene (PS), synthetic paper, and polypropylene (PP).

The wrapping above is given the belt-like shape by bending the sheet strip along the bend lines. Alternatively the wrapping may be formed originally as a short tube of resin, without using a sheet strip.

It is also possible to coat only the side flaps 53c and 53d of the wrapping with the adhesive agent, without coating of the remaining portions.

Figure 6:
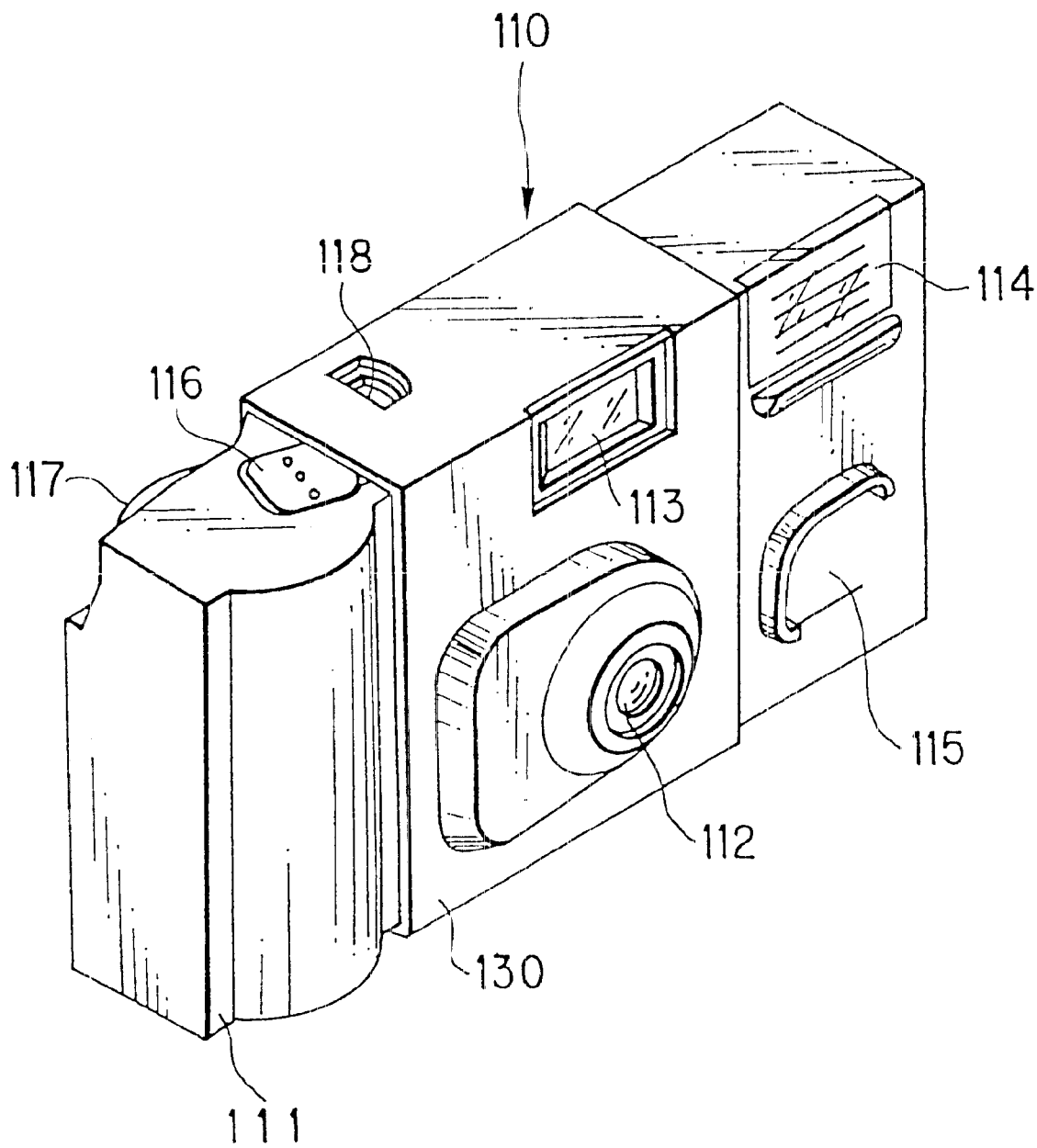
FIG. 6 is a perspective illustrating another preferred lens-fitted photo film unit.
Figure 7:
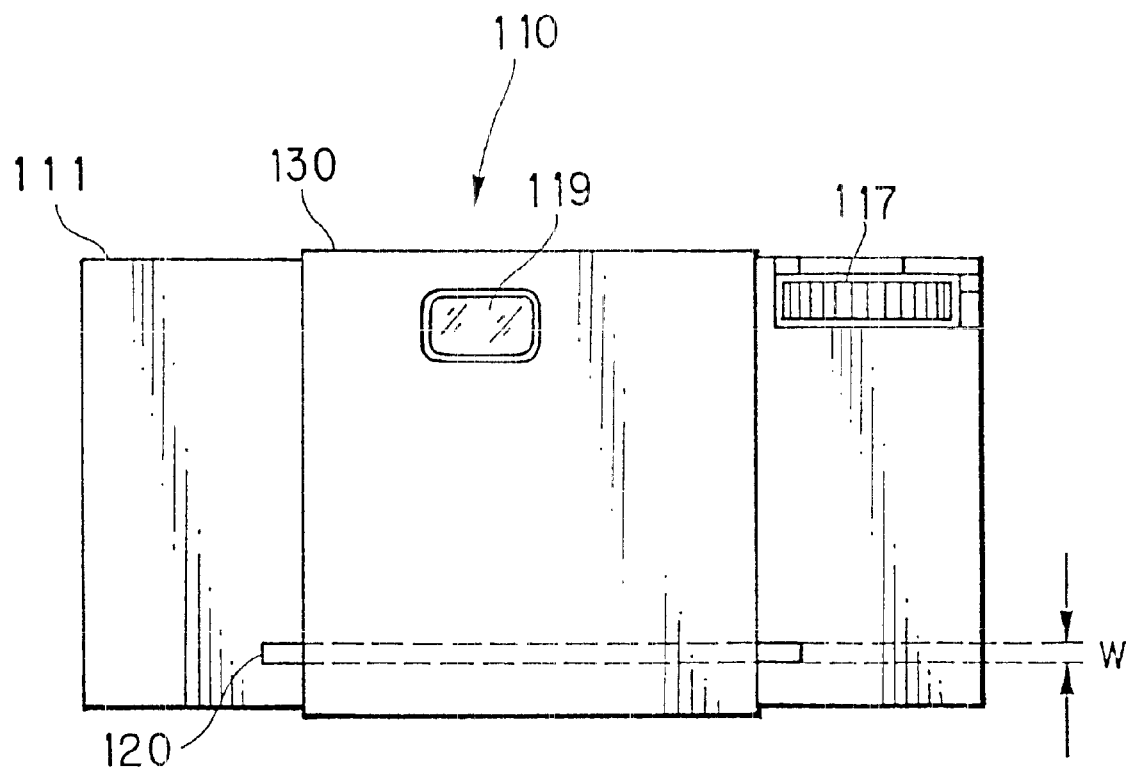
FIG. 7 is a rear elevation illustrating the lens-fitted photo film unit of FIG. 6 and having a straight groove.

A method of peeling the wrapping from a lens-fitted photo film unit is described now. In FIGS. 6 and 7, a lens-fitted photo film unit 110 includes a housing 111 and a wrapping 130 mounted about the center of the housing 111 vertically. The housing 111 incorporates a roll of photo film and a cassette, and includes a shutter mechanism and a wind stop mechanism for one-frame feeding. The housing 111 is mainly formed of plastics. The front of the housing 111 has a finder objective window 113 and an electronic flash window. A flash emanator 114 appears through the electronic flash window. A flash switch 115 is disposed in front of the housing 111. A shutter release button 116 is formed with the top of the housing 111. There is a frame counter window 118 formed in the top of the housing 111. Also the rear of the housing 111 has a finder eyepiece window 119, under which a straight groove 120 is formed horizontally. Right and left ends of the straight groove 120 emerge from sides of the wrapping 130.

Figure 8:
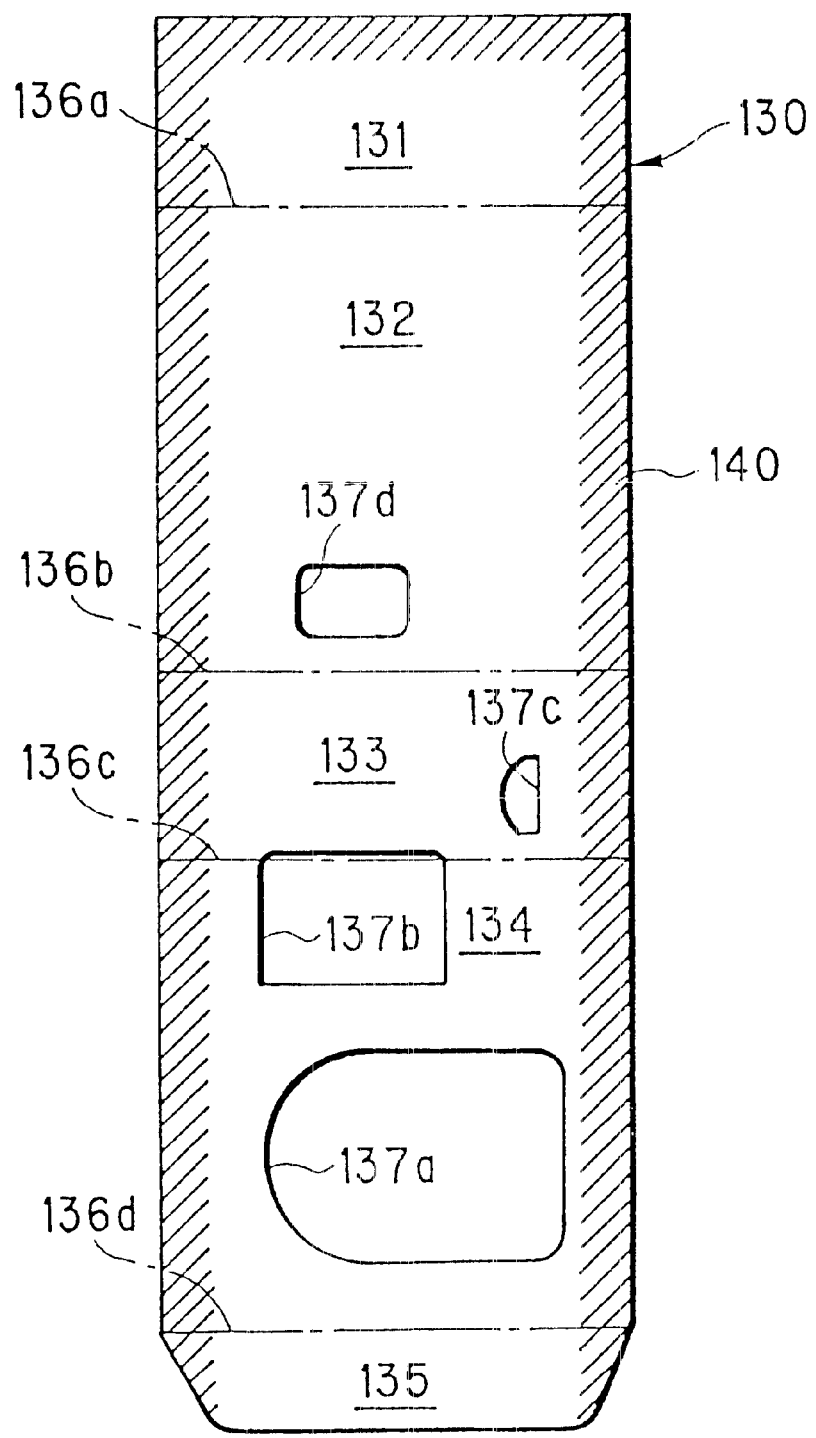
FIG. 8 is a development illustrating a reverse of a wrapping.

In FIG. 8 where the wrapping 130 is developed, the wrapping 130 consists of a sheet strip formed from synthetic paper. The wrapping 130 includes a bottom region or a first end 135, a rear region 132, a top region 133, a front region 134, and an overlapped region or a second end 131. The first end 135 is.used for adhesion on the second end 131. The wrapping 130 has inward bend lines 136a–136d defined between the second end 131, the rear region 132, the top region 133, the front region 134 and the first end 135, as indicated by the phantom lines. The front region 134 has openings 137a and 137b. A taking lens 112 emerges through the opening 137a. The objective window 113 appears through the opening 137b. The top region 133 has an opening 137c, through which the frame counter window 118 appears. The rear region 132 has an opening 137d, through which the finder eyepiece window 119 appears. Exposures can be taken without removing the wrapping 130. An adhesive region 140 of the back of the wrapping 130 is coated with water soluble adhesive agent. Note that any type of adhesive agent may be used as the adhesive region 140 among types of which water is solvent, and which are attachable to paper or plastics. For example, acrylic adhesive agent of a water soluble emulsion type may be used.

Figure 9:
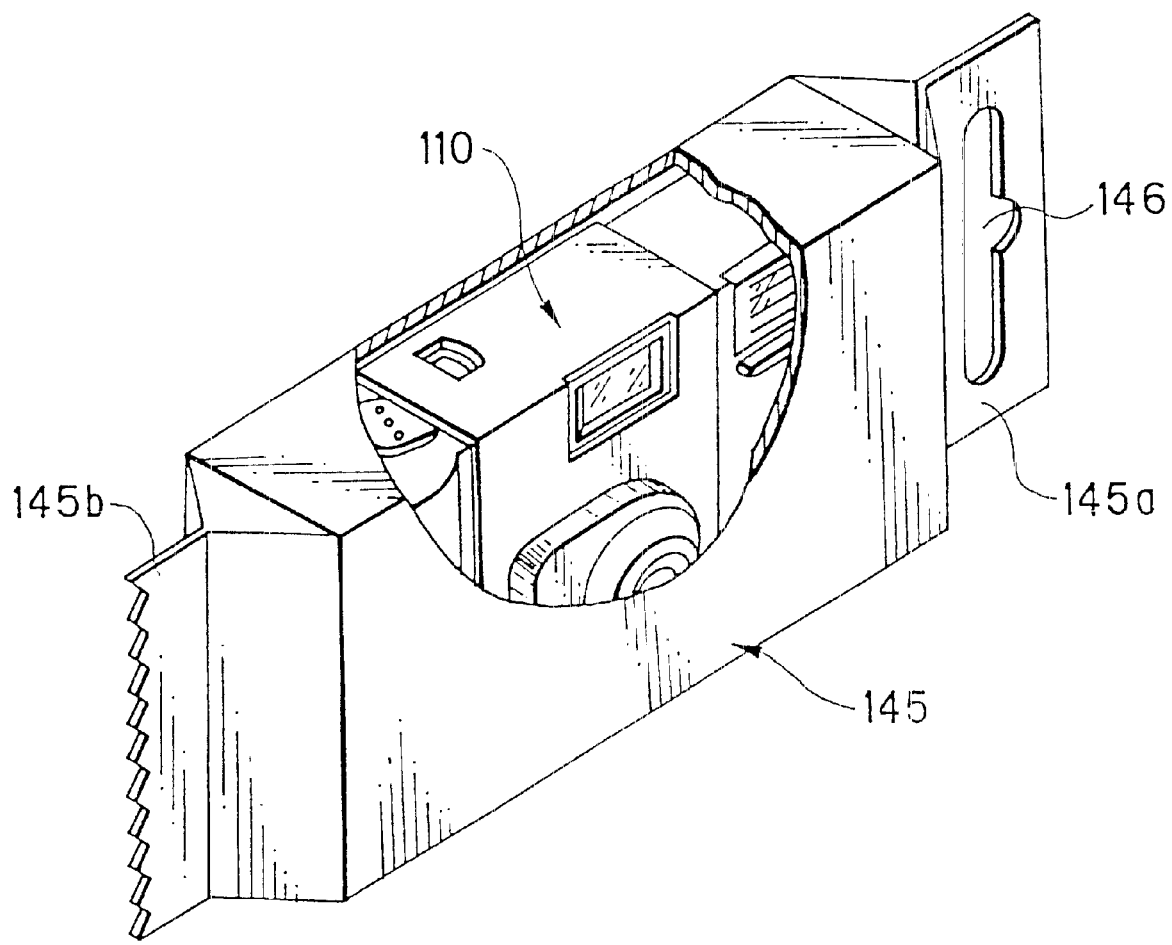
FIG. 9 is a perspective, partially broken, illustrating a gusset bag containing the lens-fitted photo film unit.

FIG. 9 illustrates a gusset bag 145 containing the lens-fitted photo film unit 110. The gusset bag 145 has a pillow form, and encloses the lens-fitted photo film unit 110 in air-tight fashion. A first margin 145a has a slot 146 adapted to suspension on a hanger for commercial display in a store. A second margin 145b has an edge cut in a corrugated form for the purpose of making it easy to open the gusset bag 145.

Figure 10:
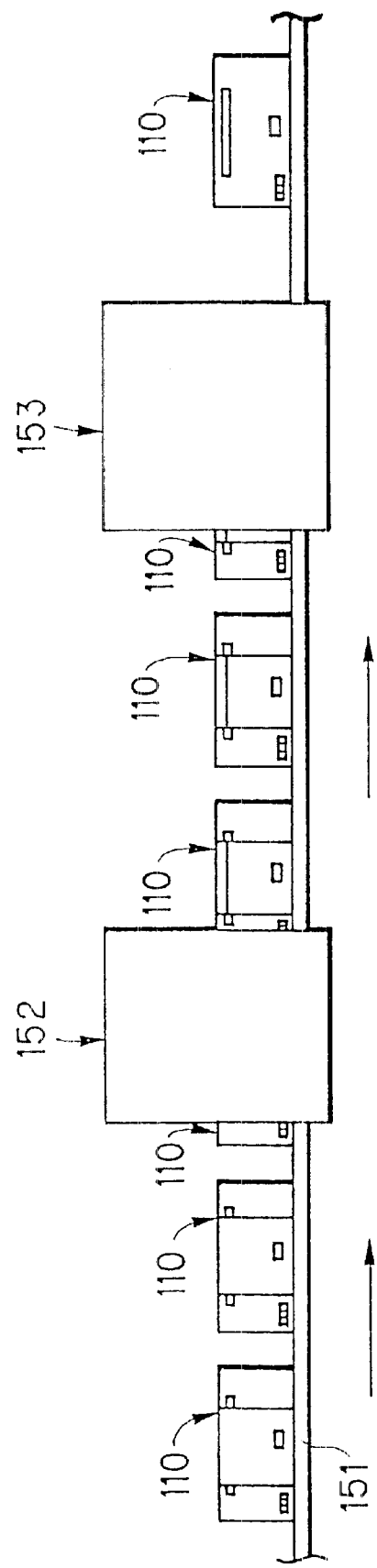
FIG. 10 is an explanatory view in elevation, illustrating a line for removing the wrapping from the housing.

FIG. 10 illustrates a process of peeling the wrapping 130. The lens-fitted photo film unit 110, withdrawn from a consumer through the market, is aligned on a conveyor 151, and conveyed to the right as depicted. The lens-fitted photo film unit 110 is placed while setting the straight groove 120 in the housing 111 in a direction of the conveyance of the lens-fitted photo film unit 110. There are disposed a sheet cutter device 152 and a sheet peeler device 153 both near to the conveyor 151. The sheet cutter device 152 cuts the wrapping 130 as wound about the housing 111. The sheet peeler device 153 peels the wrapping 130 from about the housing 111.

Figure 12A:
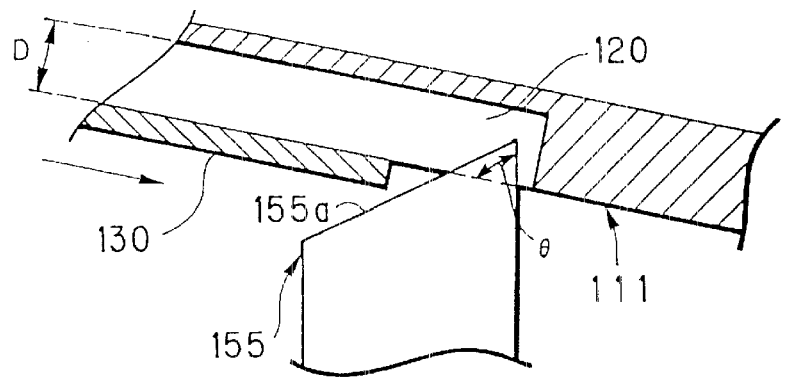
FIGS. 12A–12C are explanatory views in plan, illustrating beginning, middle and ending steps of cutting the wrapping with the cutter blade.
Figure 12B:
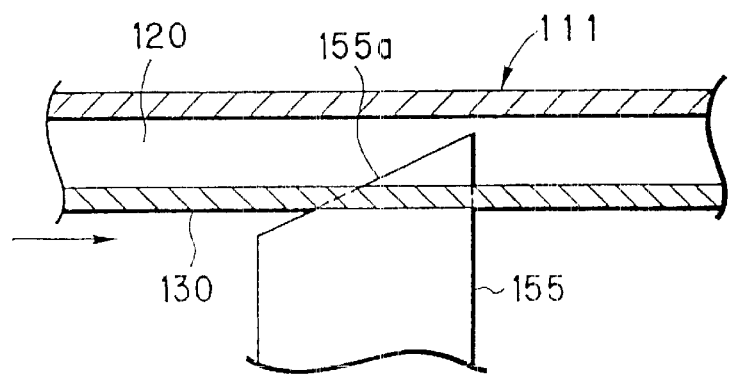
Figure 12C:
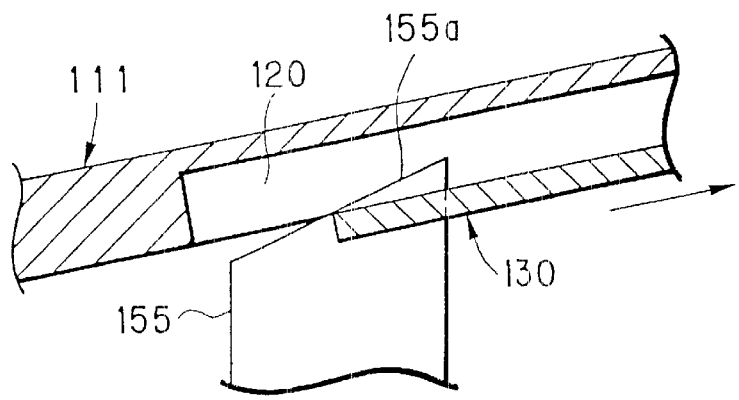

In FIG. 11, a conveying path of the conveyor 151 for the lens-fitted photo film unit 110 is curved in the sheet cutter device 152. The sheet cutter device 152 has a cutter blade 155 close to the conveyor 151. The cutter blade 155 is disposed to project into the conveying path and insertable into the straight groove 120 in the housing 111. A blade facet 155a is directed upstream along the conveyance of the lens-fitted photo film unit 110. In FIGS. 12A–12C, when the lens-fitted photo film unit 110 comes to the front of the cutter blade 155, the cutter blade 155 is entered into the straight groove 120. In the course of movement of the lens-fitted photo film unit 110, the wrapping 130 is cut down.

Figure 13:
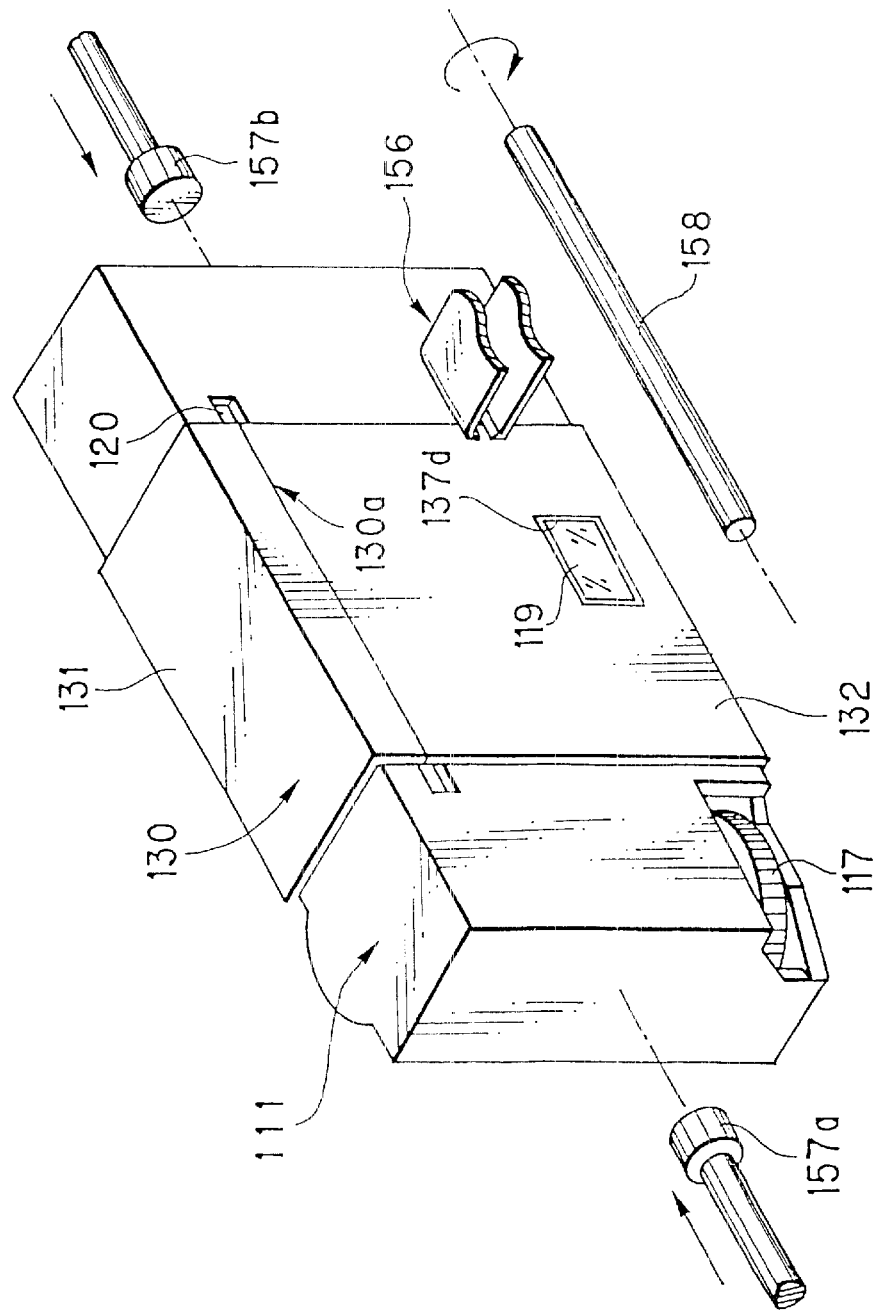
FIG. 13 is an explanatory view in perspective, illustrating a structure of a sheet peeler device.

The lens-fitted photo film unit 110 on which the wrapping 130 is cut is transferred to the sheet peeler device 153. As illustrated in FIG. 13, the sheet peeler device 153 has a sheet puller 156 inclusive of two hooks, rotational shafts 157a and 157b as a housing holder, and a stripper spool 158 having a fork shape. The sheet puller 156 accesses to the housing 111 at the straight groove 120, picks up a cut end 130*a* of the wrapping 130, and pulls the cut end 130*a* away from the housing 111. The rotational shafts 157*a* and 157*b* are arranged to confront each other, and are rotatable co-axially. The stripper spool 158 is parallel to the rotational shafts 157*a* and 157*b*. The rotational shafts 157*a* and 157*b* squeeze the lens-fitted photo film unit 110 in a peeling station in contact with its side faces, and cause the lensfitted photo film unit 110 to rotate in a counterclockwise direction. The stripper spool 158, after the cut end 130*a* is pulled away by the sheet puller 156, captures the cut end 130*a*, and rotates in reverse to the rotation of the rotational shafts 157*a* and 157*b*, to wind the wrapping 130 thereabout.

Note that the straight groove 120 in the housing 111 has a preferable width W of 0.5–5.0 mm and a preferable depth D of 0.5–2.0 mm. Should the width W be smaller than 0.5 mm, the sheet puller 156 could not readily enter the straight groove 120 to pick up the cut end 130*a*. Should the width W be greater than 5.0 mm, the straight groove 120 would be excessively large in the rear of the housing 111, not to give a good, appearance to the lens-fitted photo film unit 110. Should the depth D be smaller than 0.5 mm, the wrapping 130 would be extremely difficult to cut, because an excessively small gap would remain between the straight groove 120 and the wrapping 130. Should the depth D be greater than 2.0 mm, it would highly difficult to manufacture the straight groove 120 without penetrating the rear cover of the housing 111.

In assembly of the parts of the lens-fitted photo film unit 110, the housing 111 having the shutter mechanism and the unexposed photo film is transferred to a station for attaching the wrapping 130. In the attaching station, initially the front region 134 of the wrapping 130 is placed on the front of the housing 111. The adhesive region 140 behind the front region 134 is attached to the housing 111. The wrapping 130 is bent along the bend line 136*d* under the front region 134, to attach the first end 135 to the bottom of the housing 111. Then the top region 133, and then the rear region 132, are pressed on the housing 111. Finally the second end 131 is pressed on the outer face of the first end 135, to obtain the lens-fitted photo film unit 110. The rear of the wrapping 130 is directly attached to the housing 111, so that there is no gap between the housing 111 and the wrapping 130, which does not swell outwards.

The lens-fitted photo film unit 110 after the assembly of the parts is individually wrapped in the gusset bag 145 in tight fashion, and shipped out for retail sale. The lens-fitted photo film unit 110 is displayed commercially or contained in a vending machine, in a state air-tightly contained in the gusset bag 145.

The lens-fitted photo film unit 110 is firmly enclosed in the gusset bag 145 before a user breaks open the gusset bag 145. It is likely that solvent of the adhesive agent between the housing 111 and the wrapping 130 is gasified, and remains in the gas state in the gusset bag 145. However the solvent of the adhesive agent used in the present invention is water. If the solvent is gasified, only vapor is generated, without any chemical gas. It is therefore possible to keep the photo film in the lens-fitted photo film unit 110 in good condition without changes in the characteristics.

To take a photograph, the gusset bag 145 is opened by tearing the corrugation of the second margin 145*b*, to take out the lens-fitted photo film unit 110. Exposures are taken by a user with the lens-fitted photo film unit 110. Afterwards the user brings the lens-fitted photo film unit 110 to a photofinishing agent and places an order for photofinishing.

The lens-fitted photo film unit 110 after the-exposures is forwarded to a photo laboratory, where the photo film is removed from the housing 111. The photo film is developed, and subjected to printing operation for producing photo prints, which are sent back to the user. The lens-fitted photo film unit 110 from which the photo film is removed is withdrawn from the photo laboratory by a manufacturer, and transferred to a process of recycling.

In a process of disassembling the lens-fitted photo film unit 110, the wrapping 130 is peeled first. The lens-fitted photo film unit 110 is aligned on the conveyor 151, and transferred into the sheet cutter device 152.

In the sheet cutter device 152, the lens-fitted photo film unit 110 is moved past the cutter blade 155 along the conveying path, so that the wrapping 130 is cut. The conveying path of the conveyor 151 is curved at the cutter blade 155. The angle θ, defined between the direction of the cutter blade 155 and the conveying direction, is an acute angle in FIG. 12A. Accordingly the cutter blade 155 can enter the straight groove 120 without contacting the outside of the straight groove 120 of the housing 111, and can be pressed against the wrapping 130 at a sufficiently deep angle of the blade facet 155*a*. In FIG. 12B, the lens-fitted photo film unit 110 is moved further to continue cutting the wrapping 130. In FIG. 12C, when the wrapping 130 finishes being moved past the cutter blade 155, the blade facet 155*a* has a somewhat shallow angle with reference to the wrapping 130. The blade facet 155*a* is almost parallel to the wrapping 130. The cutter blade 155 is relatively moved away from the straight groove 120 without contacting the housing 111 outside the straight groove 120.

Figure 14A:
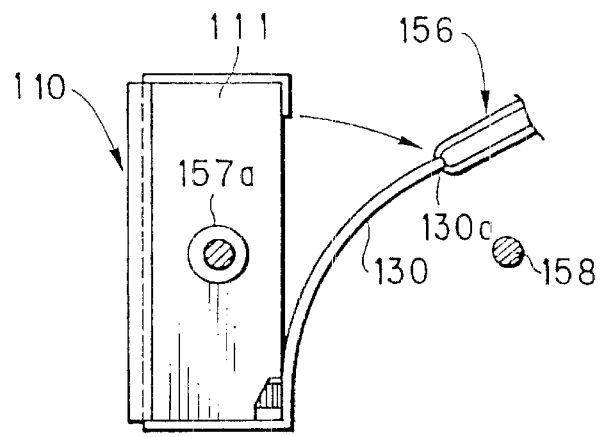
FIGS. 14A–14C are explanatory views in elevation, illustrating beginning, middle and ending steps of operating the sheet peeler device.
Figure 14B:
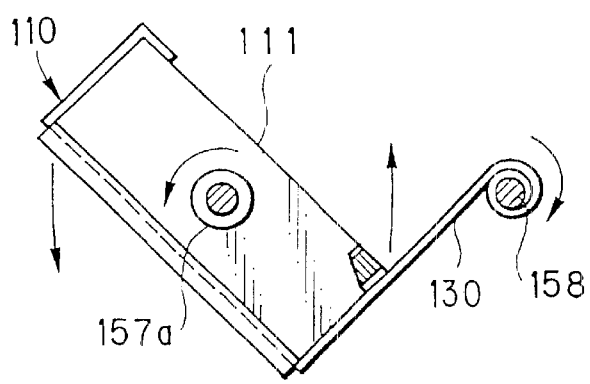
Figure 14C:
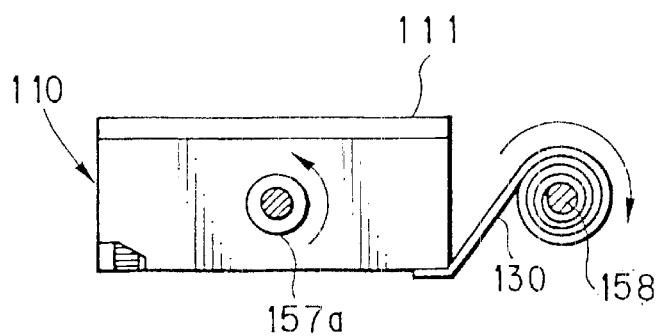

The lens-fitted photo film unit 110 of which the wrapping 130 is cut is transferred to the sheet peeler device 153. When the lens-fitted photo film unit 110 comes to a peeling station, the rotational shafts 157*a* and 157*b* are contacted on the side faces of the lens-fitted photo film unit 110. In FIG. 14A, the sheet puller 156 enters the straight groove 120 in the housing 111, picks up the cut end 130*a* of the wrapping 130, and pulls the cut end 130*a*, to allow the stripper spool 158 to capture the cut end 130*a*. In FIGS. 14B and 14C, the rotational shafts 157*a* and 157*b* are rotated in the counterclockwise direction with the lens-fitted photo film unit 110. At the same time the stripper spool 158 rotates in the clockwise direction. Both the housing 111 and the wrapping 130 are moved away from each other. The wrapping 130 is peeled from the housing 111 and wound about the stripper spool 158. The adhesive region 140 has the thinly striped form on the back of the wrapping 130, which is peeled in the direction of the striped form of the adhesive region 140. The adhesive region 140 has a sufficiently small area, and small adhering force, so that it is easy to peel the wrapping 130. The wrapping 130 as removed is withdrawn and remelted collectively, and recycled as a regenerated paper.

The housing 111 after peeling the wrapping 130 is transferred to a washing station, where the housing 111 is washed with alkali liquid or water. The adhesive agent between the housing 111 and the wrapping 130 characteristically has solvent of water. The adhesive agent remaining on the housing 111 is dissolved in the alkali liquid, and removed without depositing on the housing 111. The housing 111 as washed is disassembled part from part. Parts from the housing 111 are classified. Reusable ones of them are transferred to a manufacturing process, and remounted on a new product. Meltable ones of them are pelleted, and recycled as regenerated material.

In the above embodiment, the adhesive region 140 is continuously formed. However the present invention is applicable to a use of a plurality of spot-like adhesive areas arranged linearly. Also it is possible to use a technique of partial destruction of adhesive areas. Namely, the whole of the back of the sheet strip is coated with adhesive agent at first. Then a middle area of the back of the sheet strip is subjected to printing treatment of destroying the adhesive characteristic, so as to obtain the adhesive region 140 in the continuously or intermittently striped form.

In the above, the rotational shafts 157a and 157b squeeze the housing 111 in contact with its side faces. Alternatively a single housing holder, such as a rotatable robot hand, may grasp one side face, and rotate the housing 111 similarly.

In the above, the housing 111 is rotated by the rotational shafts 157a and 157b before removal from the wrapping 130. The rotational shafts 157a and 157b are driven by a motor. It is alternatively possible to keep the rotational shafts 157a and 157b rotatable freely without using the motor, and to allow the stripper spool 158 to rotate the housing 111 in the reverse direction and in transmission via the wrapping 130.

In the above, the housing 111 is rotated in removal of the wrapping 130. Alternatively the housing 111 may be pressed out of the wrapping 130, as disclosed in EP-A 0 598 393 (corresponding to JP-A 6-161053).

In the above, the first end 135 is adhered to the housing 111 only partially. It is however possible to coat the whole of the reverse of the first end 135 with the adhesive agent for adhesion to the housing 111. In the above, the second end 131 is adhered to the first end 135 with the common pressure sensitive adhesive agent. Alternatively the second end 131 may be adhered to the first end 135 by use of hot-melt adhesive agent having a water soluble characteristic. The hot-melt adhesive agent can be heated finally to wrap the housing 111.

Another preferred embodiment for overcoming another problem of a known lens-fitted photo film unit is described now. In the prior art, a top of a front cover has a release button formed integrally therewith. A bottom of the release button has a release lever formed integrally therewith. The release lever transmits movement of depression of the release button to a shutter mechanism, and actuates the shutter mechanism. There is an opening formed in the front cover and in front of the release lever. The release lever is partially inserted in the front opening, which operates to have a housing designed dimensionally less thickly than required.

In the prior art, the release lever and a movable portion of the shutter mechanism partially emerge through the front opening in the front cover. When a belt-like wrapping covers the housing, the release lever and the movable portion are likely to deposit on the wrapping due to the pressure sensitive adhesive agent. It is highly difficult to operate the release lever or the movable portion smoothly. If a user's finger pushes the wrapping over the release lever or the movable portion, they cannot resist depositing on the wrapping. It is impossible to release the shutter mechanism.

Also it is difficult to coat only partial regions on the wrapping with the adhesive agent, while not coating one region on the wrapping to locate over the front opening. If it were possible to effect the coating operation in such a manner, speed or efficiency in the operation would be considerably low, because of difficulties in positioning the wrapping on the housing. A manufacturing cost would be high.

Figure 16:
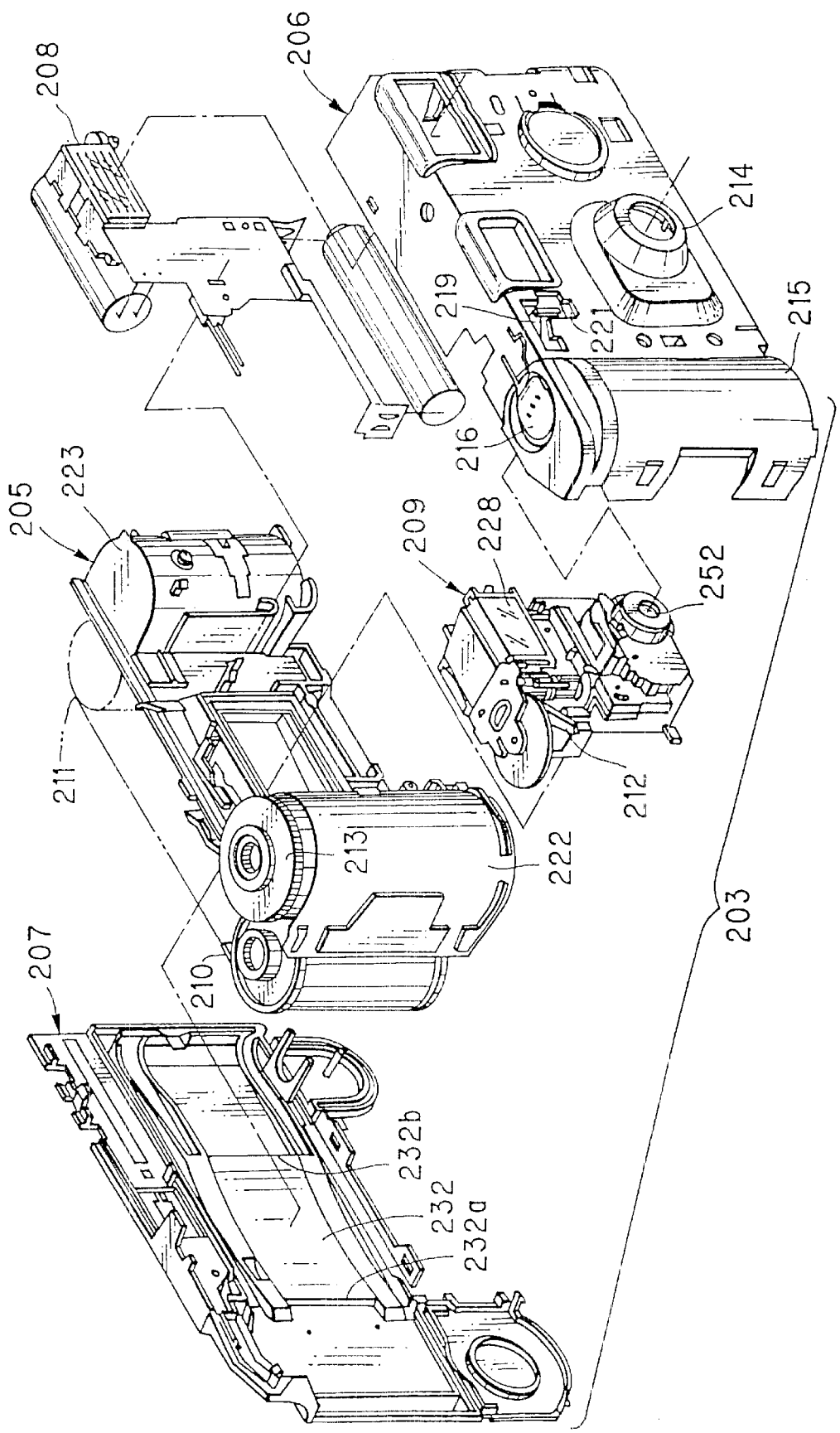
FIG. 16 is an exploded perspective illustrating the lens-fitted photo film unit of FIG. 15.

Another preferred lens-fitted photo film unit is described now, in which movable parts are improved in view of higher efficiency, in FIG. 16, a housing 203 consists of a photo film containing unit 205, an exposure-taking unit.209, a front cover 206 and a rear cover 207. The exposure-taking unit 209 incorporates a roll of photo film 211 and a cassette 210, and includes an electronic flash unit 208, a shutter mechanism and a wind stop mechanism for one-frame feeding. The front cover 206 and the rear cover 207 are retained on the photo film containing unit 205 by engagement of hooks. The photo film containing unit 205, the front cover 206 and the rear cover 207 are respectively formed mainly from resin.

The exposure-taking unit 209 includes the wind stop mechanism and a shutter lever. The wind stop mechanism includes a driven sprocket wheel, a retaining lever 212 and a cam. The driven sprocket wheel is caused by movement of photo film to make one rotation. The retaining lever 212 inhibits a photo film winding wheel 213 from rotating when the photo film is wound as much as one frame. The cam rotates in integral fashion with the driven sprocket wheel, and causes the retaining lever 212 to rotate clockwise at a small amount upon the one-frame winding. The spring biases the retaining lever 212 clockwise, causes the retaining lever 212 to be received by the cam, and inhibits the photo film from being wound. The shutter lever is retained by the retaining lever 212 in a shutter charging position, and strikes a shutter blade upon counterclockwise rotation of the retaining lever 212 to open/close a shutter opening.

The photo film containing unit 205 is covered by the front cover 206 after mounting the exposure-taking unit 209 and the flash unit 208. There are a cassette containing chamber 222 and a photo film roll chamber 223 formed in the photo film containing unit 205. The cassette containing chamber 222 contains the cassette 210. The roll chamber 223 contains a roll of the photo film 211.

A shutter release button 216 is formed with the top of the front cover 206 in fashion depressible for taking an exposure. The release button 216 is formed with a release lever 219, which pushes and rotates the retaining lever 212 upon depression of the release button 216, so as to actuate the shutter mechanism. The front cover 206 is generally molded according to the injection molding, in a form including a projecting portion 214, an opening 221, the release button 216, the release lever 219, and other openings. The release lever 219 is partially inserted in the opening 221. Note that the projecting portion 214 covers the retaining lever 212 and the shutter mechanism.

The front cover 206 has a projecting portion 215 to cover the front of the cassette containing chamber 222. The projecting portion 215 is used as a grip at the time of taking exposures. The rear cover 207 is secured to the photo film containing unit 205 to cover the cassette containing chamber 222 and 223 containing the cassette 210 and the photo film 211.

In FIG. 15, a lens-fitted photo film unit 202 includes the housing 203 and a decoratively printed wrapping 204 mounted about the center of the housing 203 vertically. Pressure sensitive adhesive agent is applied to the back of the wrapping 204, and in a front region in front of the housing 203, and in first and second ends overlapped on one another under the housing 203. The opening 221 is covered and closed by the wrapping 204, and protected from entry of dust to the inside of the housing 203.

The wrapping 204 has plural openings through which the projecting portion 214 and a viewfinder 228 respectively emerge. A flash emanator 218 and the projecting portion 215 appear beside the wrapping 204.

In operation of the lens-fitted photo film unit, the photo film winding wheel 213 is rotated at first, for the one-frame winding of the photo film. Responsively the shutter lever is moved back to the shutter charging position, and retained by the retaining lever 212. The release button 216 is depressed. The release lever 219 rotates the retaining lever 212 in the counterclockwise direction. The shutter lever, after releasing the retention of the retaining lever 212, strikes the shutter blade to open/close the shutter opening.

Figure 17:
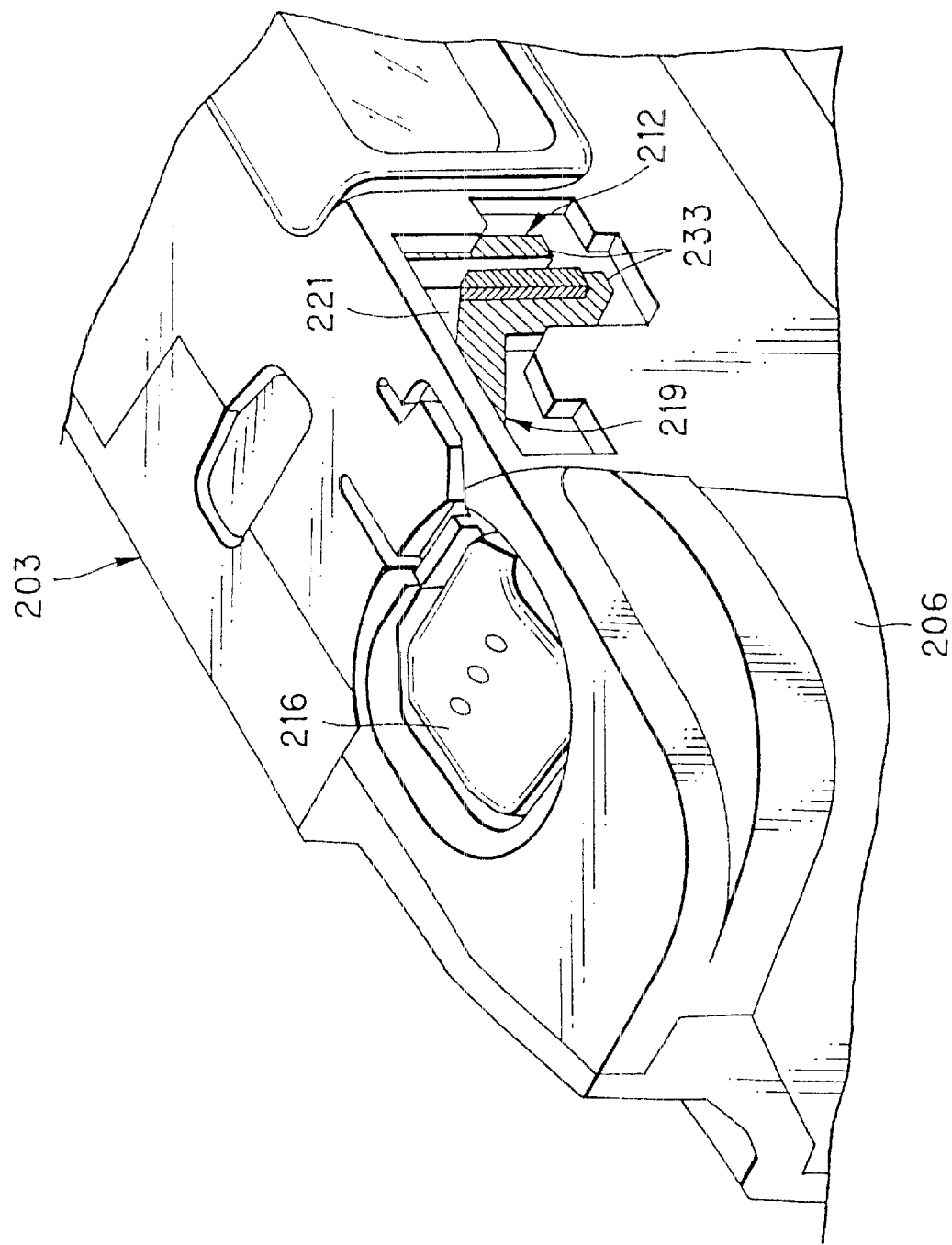
FIG. 17 is a perspective illustrating a release lever and a retaining lever respectively having minutely uneven faces and being accessible through an opening.

As hatched in FIG. 17, the release lever 219 and the retaining lever 212 respectively have minutely uneven faces 233 arranged inside the opening 221 in externally accessible fashion. The minutely uneven faces 233 have mat finished surfaces, embossed surfaces, pear-skin surfaces, or other suitable types of uneven surfaces. When the wrapping 204 is pressed on the release lever 219 or the retaining lever 212, the wrapping 204 is readily separated from the release lever 219 and the retaining lever 212 by virtue of the minutely uneven faces 233, even with the pressure sensitive adhesive agent.

Figure 18A:
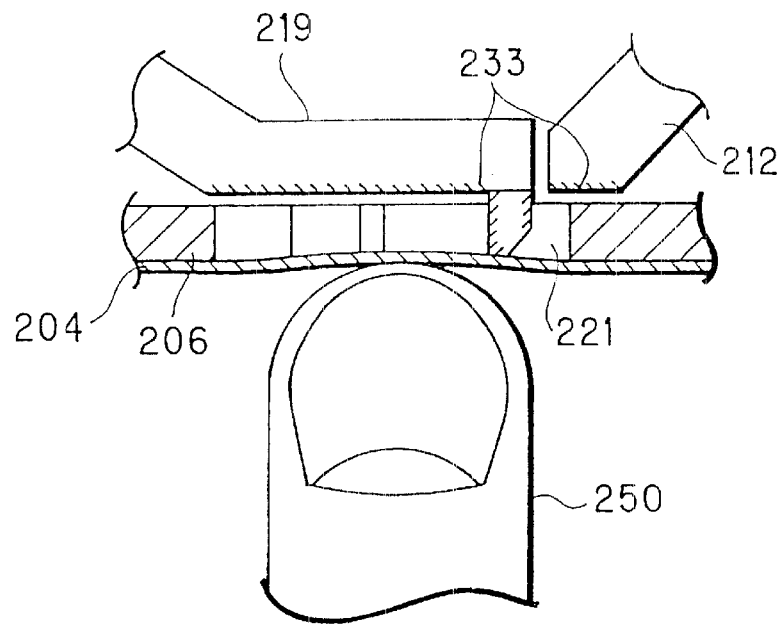
FIGS. 18A and 18B are explanatory views in section, illustrating relative positions of the release lever and the retaining lever in relation to the wrapping.
Figure 18B:
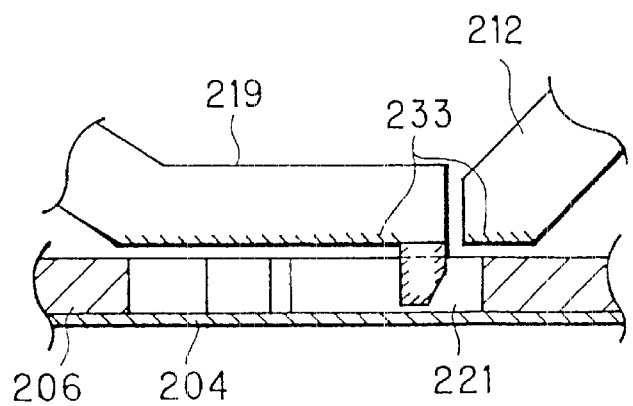

As illustrated in FIG. 18A, if the portion of the wrapping 204 over the opening 221 is depressed by a finger 250 to the release lever 219 and the retaining lever 212, the levers 219 and 212 have the minutely uneven faces 233 and are not inseparably stuck to the depressed portion. The housing 203 enables the wrapping 204 to be peeled therefrom in the state of FIG. 18B, by virtue of moving force of the release lever 219 and the retaining lever 212 or by the recovering characteristic of the wrapping 204 itself. No problem arises in taking an exposure. Acceptable appearance of the lens-fitted photo film unit can be kept.

In the above embodiment, the wrapping 204 has a belt-like shape. However the present invention is applicable to a wrapping having a small length only to cover three faces of the lens-fitted photo film unit. For example, the front, top and rear of the housing 203 may be covered without covering its bottom.

It is also possible to provide the shutter lever with the minutely uneven faces 233 in addition to the release lever 219 and the retaining lever 212. A greater opening or an additional opening can be formed for entry of the shutter lever, in consideration of reducing a back-to-front thickness of the housing 203.

Figure 23A:
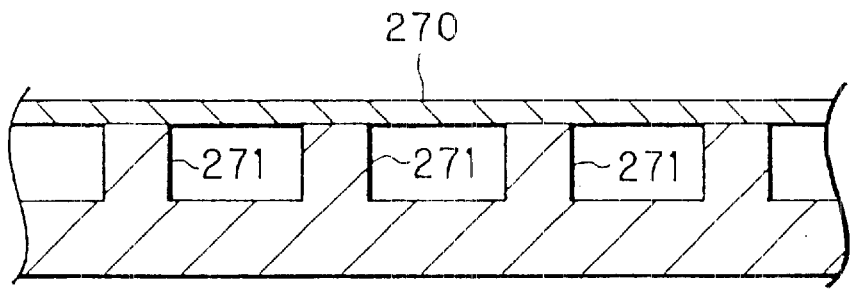
FIGS. 23A and 23B are cross sections partially illustrating a comparative example without rounding off the outer edges or the ridge edges.
Figure 23B:
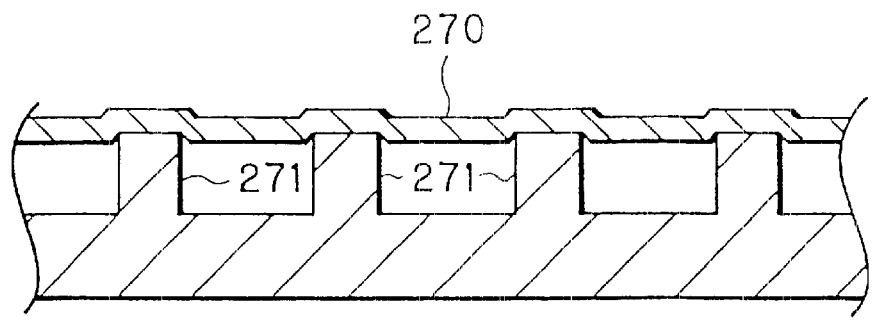

There remains another shortcoming in the lens-fitted photo film unit. FIG. 23A illustrates an outside of a rear cover in enlargement. A wrapping 270 covers plural ridges 271 on the rear cover, is supported thereby and is kept flat. The ridges 271 have angular edges. If a user's finger presses the wrapping 270 toward the ridges 271, ridge-like marks are likely to occur on the outside of the wrapping 270 in FIG. 23B, to give the user a visual impression of a low quality lens-fitted photo film unit.

Figure 19:
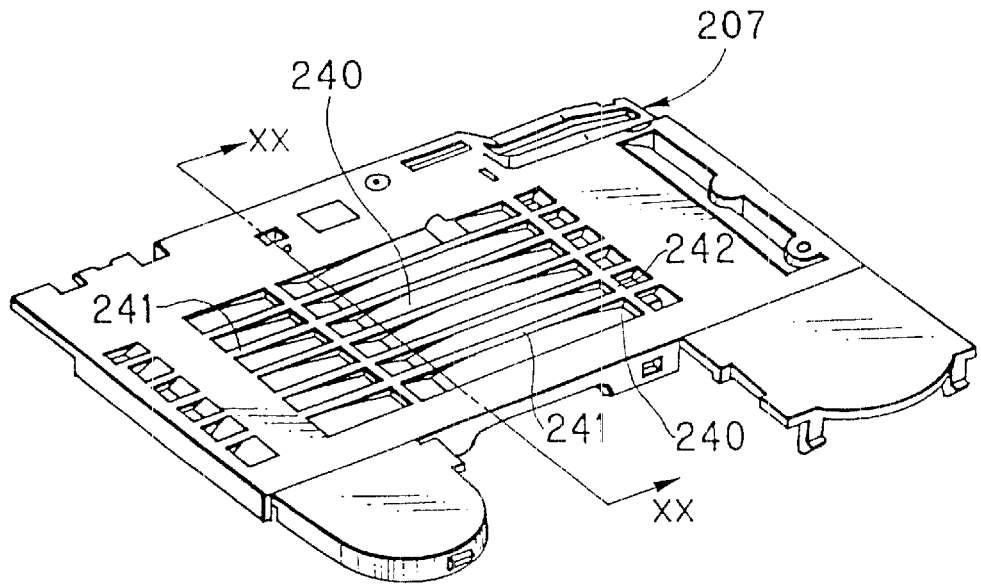
FIG. 19 is a perspective illustrating another preferred rear cover.
Figure 20:
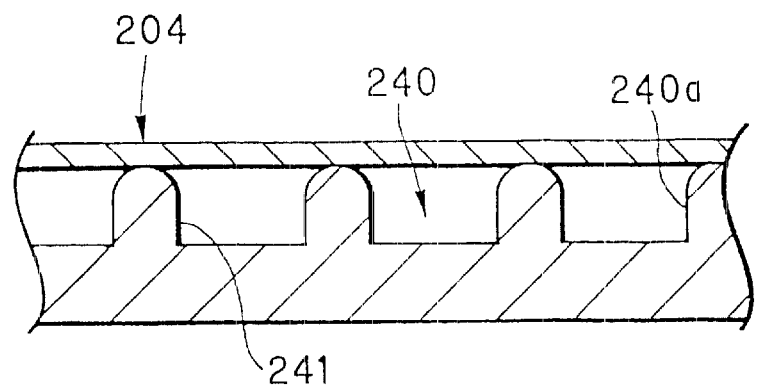
FIG. 20 is a cross section partially illustrating the rear cover with the wrapping, where outer edges of recesses are rounded off, and edges of ridges are rounded off.

A construction for improving appearance of the wrapping 204 is described now with reference to FIGS. 19 and 20. In the center of the rear cover 207, a photo film support face 232 is formed concavely with a curvature associated with the rear of an exposure aperture 231 of the photo film containing unit 205, in a shape suitable for aberrations of a taking lens 252. There are projecting portions 232a and 232b formed on lateral edges of the support face 232. The projecting portions 232a and 232b apply tension to the photo film 211, to keep it flat on the support face 232 between the projecting portions 232a and 232b.

In FIG. 19, the rear cover 207 has recesses 240, which are defined as reverse faces of the projecting portions 232a and 232b and the periphery of the support face 232 shaped to project toward the front of the rear cover 207. The recesses 240 ensure that the rear cover 207 has a uniform thickness irrespective of the shape of the projecting portions 232a and 232b and the support face 232. This is effective in avoiding occurrence of sink marks which would be created in the course of a cooling and solidifying step of the injection molding.

A plurality of ridges 241 and 242 are formed in the recesses 240 and arranged like a grating. The ridges 241 and 242 operate for supporting the wrapping 204 without gaps or looseness about the housing 203. Note that the ridges 241 and 242 can be more numerous than depicted, in view of more reliable avoidance of looseness. The recesses 240 in FIG. 20, taken on line XX—XX in FIG. 19, have outer edges 240a about its openness. The outer edges 240a are rounded off. Also edges of the ridges 241 and 242 are rounded off.

In the present invention, the outer edges 240a of the recesses 240 and the edges of the ridges 241 and 242 are rounded off, i.e., the edges have convex curvature. Even when the portion of the wrapping 204 over the recesses 240 is rubbed and forcibly pressed by a finger, the wrapping 204 does not have tendency of having stripe marks of the ridges 241 and 242.

In the present embodiment, the pressure sensitive adhesive agent is applied to the wrapping 204 in the first and second ends overlapped on one another under the housing 203. It is possible to designate a region to be coated with the adhesive agent: using the whole area of the back of the wrapping 204 for the coating, or a striped region or differently shaped regions of the back of the wrapping 204. It is preferable to designate a region covering the recesses 240 for preventing the wrapping 204 from unwanted movement relative to the housing 203.

Figure 21:
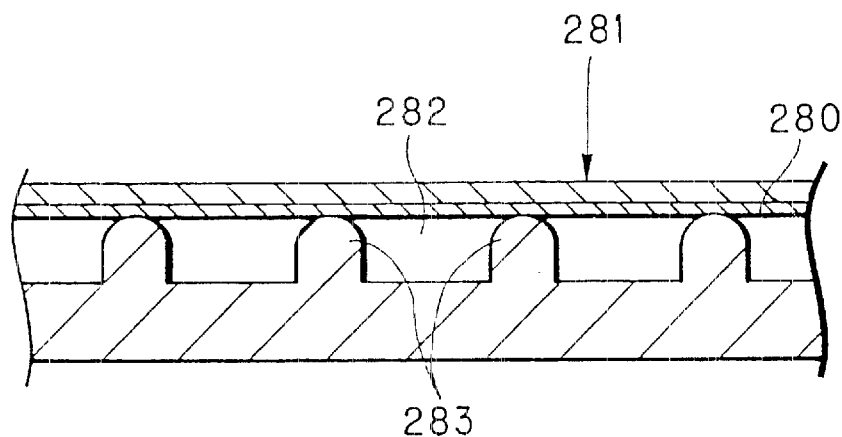
FIG. 21 is a cross section illustrating a variant where the wrapping is adhered to the rear cover.

FIG. 21 illustrates another preferred embodiment, in which adhesive agent 280 is applied to the back of a wrapping 281. Edges of openness of recesses 282 and edges of ridges 283 are rounded off, i.e., the edges have convex curvature, so that the wrapping 281 is kept from inseparable adhesion to the recesses 282 and the ridges 283. Even if the wrapping 281 is depressed by manual handling of the recesses 282, the wrapping 281 readily recovers its original flat form.

Figure 22:
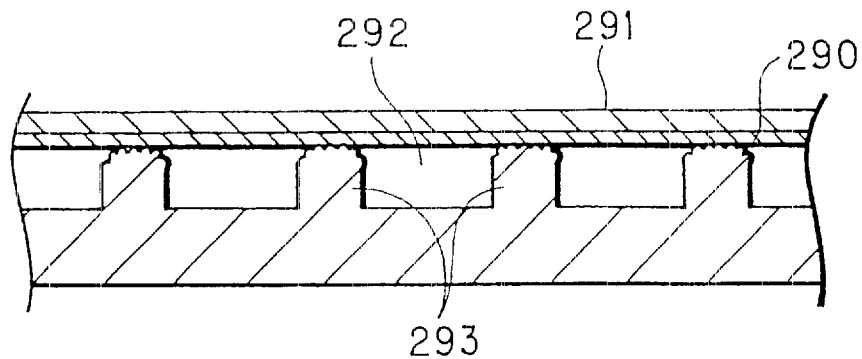
FIG. 22 is a cross section illustrating another variant where the ridges have minutely uneven faces.

It is also preferable in FIG. 22 to form tops of the ridges 293 with minutely uneven faces, such as mat finished surfaces, embossed surfaces, pear-skin surfaces, or other suitable types of uneven surfaces. A wrapping 291 is attached to recesses 292 by applying a coating of adhesive agent 290. The uneven faces of the ridges 293 operate to reduce effectiveness of the wrapping 291. Even if the wrapping 291 is depressed by manual handling of the recesses 292, the wrapping 291 readily recovers its original flat form. The wrapping 291 can be peeled easily.

In the present embodiment, the recess and the ridges are formed with the rear cover 207. The present invention is applicable to use of a recess and ridges formed with a front cover, or other portion of the housing.

In the above, the wrappings 204, 281 and 293 are wound about the housing 203. The present invention is also applicable to the use of a rectangular sheet as a label only disposed on the rear cover 207 to cover the recesses and the ridges.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A method of removal of wrapping for a lens-fitted photo film unit, said lens-fitted photo film unit including a housing and a wrapping member wound about at least one portion of said housing in belt-like fashion, said housing being pre-loaded with unexposed photo film, and incorporating a taking lens and a shutter mechanism, there being formed a substantially straight groove in an outside of said housing and transverse to a direction of winding said wrapping member, said method of removal of wrapping comprising steps of:

effecting relative movement, for said lens-fitted photo film unit to move relative to a cutter blade while said lens-fitted photo film unit is contacted on said cutter blade, said cutter blade being disposed as high as said groove in said housing, and cutting said wrapping member along said groove; and peeling said wrapping member, being cut by said cutter blade, from said housing.

2. A method of removal of wrapping as defined in claim 1, wherein said groove is formed in a rear of said housing, has two distal ends, externally exposed beside said wrapping member.

3. A method of removal of wrapping as defined in claim 2, further comprising steps of:

nipping and pulling away a cut end of said wrapping member, being cut by said cutter blade, away from said groove;

rotating said housing in said winding direction by holding said housing on a rotatable housing holder;

capturing said cut end being pulled away on a stripper spool; and rotating said stripper spool while said housing is rotated, to wind said wrapping member.

4. A method of removal of wrapping as defined in claim 2, wherein said cutter blade is disposed in stationary fashion, and said lens-fitted photo film unit is aligned in a direction of said groove in said housing, and conveyed past said cutter blade.

5. A method of removal of wrapping as defined in claim 2, wherein said wrapping member is attached to said housing with water soluble adhesive agent.

6. A method of removal of wrapping as defined in claim 2, wherein a path of conveying said lens-fitted photo film unit is curved away from said cutter blade.

7. A apparatus for removal of wrapping of a lens-fitted photo film unit, said lens-fitted photo film unit including a housing and a wrapping member wound about at least one portion of said housing in belt-like fashion, said housing being pre-loaded with unexposed photo film, and incorporating a taking lens and a shutter mechanism, there being a substantially straight groove formed in an outside of said housing and transverse to a direction of winding said wrapping member, said apparatus for removal of wrapping comprising:

a conveyor for conveying said lens-fitted photo film unit;

a cutter blade, disposed as high as said groove in said housing, contacted on said lens-fitted photo film unit conveyed by said conveyor, for cutting said wrapping member along said groove; and a puller device for pulling away a cut end of said wrapping member, cut by said cutter blade, away from said groove, so as to peel said wrapping member from said housing.

* * * * *